US010885809B2

(12) United States Patent
Roche

(10) Patent No.: US 10,885,809 B2
(45) Date of Patent: Jan. 5, 2021

(54) DEVICE FOR LANGUAGE TEACHING WITH TIME DEPENDENT DATA MEMORY

(71) Applicant: GammaKite, Inc., Belmont, MA (US)

(72) Inventor: Emmanuel Roche, Belmont, MA (US)

(73) Assignee: Gammakite, Inc., Belmont, MA (US)

( * ) Notice: Subject to any disclaimer, the term of this patent is extended or adjusted under 35 U.S.C. 154(b) by 425 days.

(21) Appl. No.: 15/575,659

(22) PCT Filed: May 20, 2016

(86) PCT No.: PCT/IB2016/000923
§ 371 (c)(1),
(2) Date: Nov. 20, 2017

(87) PCT Pub. No.: WO2016/185289
PCT Pub. Date: Nov. 24, 2016

(65) Prior Publication Data
US 2018/0158365 A1     Jun. 7, 2018

Related U.S. Application Data

(63) Continuation of application No. 14/719,176, filed on May 21, 2015, now abandoned.
(Continued)

(51) Int. Cl.
| | |
|---|---|
| *G09B 19/06* | (2006.01) |
| *G06F 3/0481* | (2013.01) |
| *G09B 17/00* | (2006.01) |
| *H04L 29/06* | (2006.01) |
| *G09B 5/06* | (2006.01) |
| *G09B 19/04* | (2006.01) |
| *G09B 5/04* | (2006.01) |

(52) U.S. Cl.
CPC .......... *G09B 19/06* (2013.01); *G06F 3/0481* (2013.01); *G09B 5/067* (2013.01); *G09B 17/003* (2013.01); *G09B 19/04* (2013.01); *H04L 65/403* (2013.01); *G09B 5/04* (2013.01)

(58) Field of Classification Search
CPC .......... G09B 19/06; G09B 19/04; G09B 5/04; G06F 3/048; G06F 3/0481; G06F 3/04812
See application file for complete search history.

(56) References Cited

U.S. PATENT DOCUMENTS 5,142,657 A * 8/1992 Ezawa ...................... G06F 3/16
704/276
5,932,123 A   8/1999 Marhofer et al.
(Continued)

OTHER PUBLICATIONS

U.S. Appl. No. 16/260,591, filed Jan. 29, 2019, Roche.
(Continued)

*Primary Examiner* — Robert J Utama
(74) *Attorney, Agent, or Firm* — Smith Baluch LLP

(57) ABSTRACT

A computing device is adapted to construct a user-memory data structure for a user based on interactions with the user. The user-memory data structure may comprise a plurality of memory representations for concepts and items important for gaining proficiency in a subject matter. The memory representations are dynamic, and characterize how well each of the concepts and items are retained as a function of time by the user. The computing device uses the user-memory data structure to guide operation of the computing device.

23 Claims, 12 Drawing Sheets

Related U.S. Application Data

(60) Provisional application No. 62/255,777, filed on Nov. 16, 2015.

(56) References Cited

U.S. PATENT DOCUMENTS

| | | | |
|---|---|---|---|
| 6,077,085 A * | 6/2000 | Parry | G09B 19/06 434/322 |
| 6,419,496 B1 | 7/2002 | Vaughan, Jr. | |
| 6,652,283 B1 * | 11/2003 | Van Schaack | G09B 7/00 434/236 |
| 7,587,306 B2 * | 9/2009 | Teytaud | G09B 5/065 434/317 |
| 8,953,034 B1 | 2/2015 | Milosevic et al. | |
| 9,330,575 B2 | 5/2016 | Peters et al. | |
| 9,498,231 B2 | 11/2016 | Haider et al. | |
| 10,235,007 B2 | 3/2019 | Roche | |
| 2002/0150868 A1 | 10/2002 | Yui et al. | |
| 2003/0046057 A1 * | 3/2003 | Okunishi | G09B 5/02 704/1 |
| 2003/0203343 A1 | 10/2003 | Milner | |
| 2004/0115597 A1 | 6/2004 | Butt | |
| 2006/0168507 A1 * | 7/2006 | Hansen | H04N 21/2335 715/202 |
| 2008/0059145 A1 * | 3/2008 | Wood | G09B 19/06 704/2 |
| 2008/0077384 A1 | 3/2008 | Agapi et al. | |
| 2008/0169277 A1 | 7/2008 | Achtner et al. | |
| 2008/0293021 A1 | 11/2008 | Jang | |
| 2009/0048821 A1 * | 2/2009 | Yam | G06F 3/04842 704/3 |
| 2009/0155750 A1 | 6/2009 | Abe | |
| 2009/0191519 A1 * | 7/2009 | Wakamoto | G09B 5/04 434/157 |
| 2009/0253113 A1 | 10/2009 | Tuve | |
| 2010/0224610 A1 | 9/2010 | Wallace | |
| 2011/0006047 A1 | 1/2011 | Penrod et al. | |
| 2011/0053124 A1 | 3/2011 | Jung | |
| 2013/0119037 A1 | 5/2013 | Daniel | |
| 2013/0130210 A1 | 5/2013 | Dohring et al. | |
| 2013/0130212 A1 | 5/2013 | Dohring et al. | |
| 2013/0183645 A1 | 7/2013 | Wallace et al. | |
| 2013/0256289 A1 | 10/2013 | Knoener et al. | |
| 2013/0264322 A1 | 10/2013 | Bornemann et al. | |
| 2013/0265416 A1 | 10/2013 | Enyedy et al. | |
| 2014/0039870 A1 | 2/2014 | Roy et al. | |
| 2014/0144898 A1 | 5/2014 | Upton | |
| 2014/0170613 A1 | 6/2014 | Jensson | |
| 2014/0220540 A1 | 8/2014 | Burgin et al. | |
| 2014/0272821 A1 | 9/2014 | Pitschel et al. | |
| 2014/0303956 A1 | 10/2014 | Wilson | |
| 2015/0122781 A1 | 5/2015 | Albrecht | |
| 2015/0248845 A1 | 9/2015 | Postlethwaite et al. | |
| 2015/0328710 A1 | 11/2015 | Kachline | |
| 2015/0379894 A1 | 12/2015 | Becker et al. | |
| 2016/0027088 A1 | 1/2016 | Jensen et al. | |
| 2016/0343272 A1 | 11/2016 | Roche | |
| 2019/0155457 A1 | 5/2019 | Roche | |

OTHER PUBLICATIONS

PCT/IB2016/000923, Nov. 30, 2017, International Preliminary Report on Patentability.
International Search Report and Written Opinion for International Application No. PCT/IB2016/000923 dated Sep. 30, 2016.
International Preliminary Report on Patentability for International Application No. PCT/IB2016/000923 dated Nov. 30, 2017.
U.S. Appl. No. 15/209,495, filed Jul. 13, 2016, Roche.
PCT/IB2016/000923, Sep. 30, 2016, International Search Report and Written Opinion.
[No Author Listed], Forgetting curve. Wikipedia. https://en.wikipedia.org/wiki/Forgetting_curve Mar. 22, 2018. 3 pages.

* cited by examiner

DEVICE FOR LANGUAGE TEACHING WITH TIME DEPENDENT DATA MEMORY

RELATED APPLICATIONS

This application is a national stage of PCT/IB2016/000923 which claims priority under 35 U.S.C. § 119(e) to U.S. Provisional Application Ser. No. 62/255,777, entitled "ENRICHED LANGUAGE-LEARNING SYSTEM" filed on Nov. 16, 2015. PCT/IB2016/000923 also claims the benefit under 35 U.S.C. § 120 of U.S. application Ser. No. 14/719,176, entitled "ENRICHED LANGUAGE-LEARNING SYSTEM" filed on May 21, 2015. The entire contents of these applications are incorporated herein by reference in their entirety.

FIELD

The described apparatus and methods relate to a computing device adapted to construct user-memory data structures that can be analyzed by the device to determine a user's time-dependent memory characteristics and affect operation of the device.

BACKGROUND

Personal computing devices (e.g., smart phones, tablets, laptops, personal computers) are ubiquitous today and are used in a variety of different ways as an aid to the user. For example, smart phone penetration in countries like China, Japan, United Kingdom, and the United States is about 50% or higher. In Japan, it is about 97% as of 2015. Perhaps the most common uses of computing devices include interpersonal communications, searching for specific information (e.g., weather information, geographical information, news reports, medical information, historical information, technical information, etc.), and internet commerce. A user who wishes to become proficient in a specific subject matter may use a computing device to research specific information available over the world-wide web and perhaps store some of the information obtained on-line for later review. In some cases, software applications relevant to a specific subject matter (e.g., sailing, building decks, plumbing, etc.) may be purchased by a user as an aid to gaining proficiency in the subject matter. However, such software applications are typically static, in that the information to be presented to the user is determined ahead of time by an unrelated third party. Further, a computing device running such software applications does not know in any detail how long a user retains the information that the user reviews nor when the user is likely to forget some of the information.

SUMMARY

According to some embodiments, a computing device is adapted to construct a subject-matter-specific, user-memory data structure (UMDS) for a user based on user-device interactions and times at which the interactions occur. A UMDS may comprise a plurality of memory representations (sub data structures) for a plurality of concepts or items that are important for the user to understand in order to gain proficiency in the subject matter. A memory representation for a concept or item may comprise parameters that quantify a memory characteristic of the user, proficiency values, algorithms, referencing and/or identifying data, etc. that can be used by the computing device to calculate a probability for a correct, or incorrect, recognition or usage of the concept or item by the user at a current or future time. Some values used to construct the memory representations may be dynamic and may be updated over time based on interactions with the user (e.g., observing, by the computing device at different times, that the user correctly or incorrectly recognizes or uses the concept or item).

Once constructed, a UMDS may be used by the computing device to determine aspects of its subsequent interactive operation with the user. For example, the computing device may determine, based on current data in a UMDS, when a concept or item should be presented to the user (e.g., timing of a graphical-user interface (GUI) presentation), how a concept or item appears when presented to the user (e.g., appearance of a GUI or text within a GUI), and whether concepts or items should be presented to the user (e.g., filtering of information presented in a GUI to the user). A computing device may also use a UMDS to manage and reduce an amount of subject-matter data stored on the device, and to discriminantly select information for transmission over a network.

In some embodiments, a computing device may operate in communication over a network with a server. The server may be adapted to construct a subject-matter UMDS for a user and use the UMDS as described in the preceding paragraphs. In some embodiments, the server may provide GUI data to the computing device over the network, and analyze responses received back from the user to construct and maintain a UMDS for the user.

Some embodiments relate to a device comprising an electronic display, a processor in communication with the electronic display, and a data storage device in communication with the processor, wherein the data storage device includes machine-readable instructions that adapt the device to: retrieve text data from a data file; render, in a user interface on the electronic display at a plurality of different times, text in a foreign language from the text data, wherein the displayed text includes a translatable item; receive translation responses for the translatable item from a user via the user interface at the plurality of different times; construct a memory representation for the translatable item based on the translation responses; store the memory representation in a UMDS for the user, wherein the memory representation comprises data representing a time-dependent accuracy of the user's translation response for the translatable item and wherein the UMDS comprises a plurality of memory representations; and determine, by the processor, an appearance of text to be displayed for the translatable item based on an accuracy determined for the translatable item from the memory representation and from the approximate time at which the text for the translatable item is to be displayed.

Some embodiments relate to a server comprising at least one processor and a data storage device in communication with the processor, wherein the data storage device includes machine-readable instructions that adapt the server to: retrieve text data from a data file; prepare user-interface data for rendering, in a user interface on a remote electronic display of an external device at a plurality of different times, text in a foreign language from the text data, wherein the displayed text includes a translatable item; receive translation responses for the translatable item from a user via the user interface at the plurality of different times; construct a memory representation for the translatable item based on the translation responses; store the memory representation in a UMDS for the user, wherein the memory representation comprises data representing a time-dependent accuracy of the user's translation response for the translatable item and wherein the UMDS comprises a plurality of memory representations; and determine, by the processor, an appearance of text to be displayed for the translatable item based on an accuracy determined for the translatable item from the memory representation and from the approximate time at which the text for the translatable item is to be displayed.

Embodiments further include non-transitory data-storage devices (electronic data-storage devices, magnetic data-storage devices, optical data-storage devices, etc.) that include machine-readable instructions to adapt at least one processor to execute acts of constructing and using user-memory data structures as described above or below.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

Figure 1:
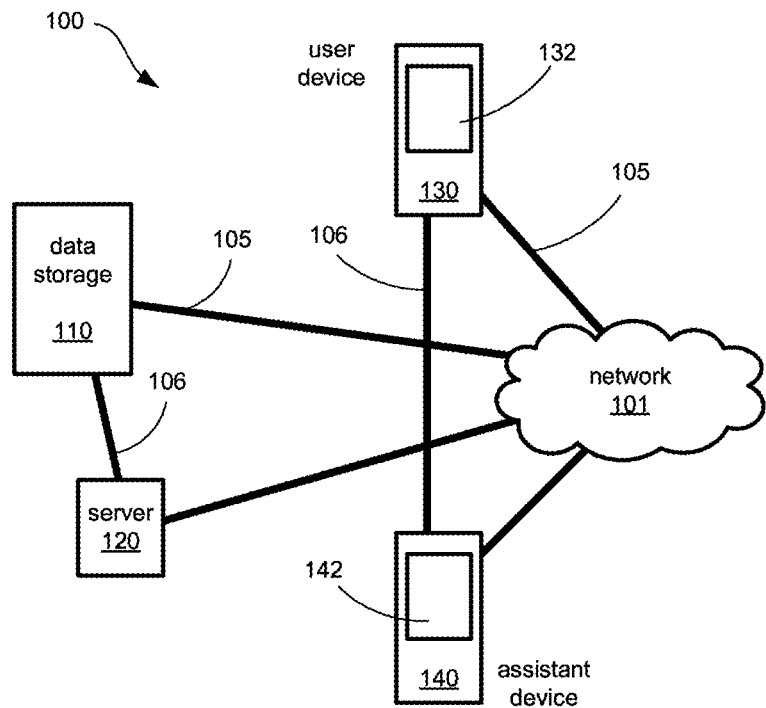
FIG. 1 depicts a network environment in which computer-constructed user-memory data structures may be implemented, according to some embodiments.

The features and advantages of the present invention will become more apparent from the detailed description set forth below when taken in conjunction with the drawings.

DETAILED DESCRIPTION

I. Introduction

The inventor has recognized and appreciated that computer-aided study of various subject matters using a personal computing device can be improved significantly by constructing a subject-matter user-memory data structure (UMDS) for a user of the computing device. The user may wish to gain or improve his knowledge of a specific subject matter (e.g., plumbing, a sport, an historical event, a foreign language, automotive mechanics, etc.). In some embodiments, a computing device used or accessed (e.g., a server) by the user to improve his knowledge may construct a subject-matter UMDS for the user based on interactions with the user. The UMDS may comprise a plurality of memory representations for concepts and items important for gaining proficiency in the subject matter. The memory representations are dynamic. They can change over time as the computing device receives more input from user interactions. The memory representations also provide a time-dependent characterization of how well the concepts and items are retained by the user as a function of time.

Once constructed, the computing device may use the UMDS to determine a variety of operational aspects for the computing device when interacting with the user. In this regard, the computing device acquires a measure of artificial intelligence, in that it can make informed decisions on its own (based on past interactions with the user) about what information should be presented to the user, how the information should appear when presented to the user, when to present information to the user, and what information it should seek to present to the user. For example, a computing device may determine from a constructed UMDS when the user is likely to forget an important concept or item pertinent to the subject matter, and automatically present the concept or item to the user for review. As another example, a computing device may search for and/or filter on-line subject matter for information relevant to the subject matter and prepared at a level of understanding that is comprehensible to or challenges the user, without overwhelming the user with incomprehensible material.

A computing device supporting a UMDS for a user can improve the ease and efficiency of user-device interactions. Less time can be spent reviewing material that is known and well-retained by the user. Interaction time can be targeted for learning relevant new material, which is at a level compatible with the user's current proficiency level and is of interest to the user, and reviewing material at an appropriate time that is not well-retained by the user. Additionally, a UMDS can be used by the computing device to manage its own physical memory (e.g., remove data from storage corresponding to items or concepts well-retained by the user), and for improving data communications (e.g., reduce data communications bandwidth by requesting and/or transmitting data that is highly relevant to the user's interest and proficiency level rather than transmitting larger amounts of data that is less relevant to the user's interest and/or not matched to the user's proficiency level). A UMDS can also be used to indicate quickly to a third party, e.g., an assistant, a proficiency level of the user.

II. Overview of Language-Learning Application

One way in which a computer-constructed user-memory data structure can be used is in the field of language learning, which is described in detail below. However, it should be appreciated from the foregoing description that computer-contrsucted UMDS's can be used for a variety of different subject-matter applications.

Traditional methods of learning a foreign language by classroom instruction, textbook study, and study groups have been supplemented, and in some cases replaced, by electronic and computer-aided language-learning programs. Examples of such language-learning programs include tape recordings, CD and DVD recordings, and/or software applications that are available from Rosetta Stone, Inc. of Arlington, Va. or from Simon & Schuster, Inc. of Concord, Mass. marketed under the Pimsleur® trademark. An advantage of electronic language-learning programs (e.g., recordings that may be played on portable devices supporting audio reproduction) and computer-aided language-learning programs (e.g., software that may be used to adapt a general-purpose computer into an instrument for interactive language learning) is that a user may use the tools at times convenient to the user, e.g., listening to an audio recording while driving in the car, studying at a computer during a lunch break. However, a disadvantage of conventional electronic and computer-aided tools is that they are typically static, in that the instructional material is predetermined. Further, such conventional tools have limited intelligence beyond providing a score to a predetermined quiz. Also, scheduling on-line interactive sessions with an assistant can be difficult to obtain and inefficient, since the assistant only has a very rudimentary understanding of the user's proficiency. A large portion of an interactive session can be consumed by the assistant trying to determine the user's proficiency.

Embodiments described below relate to computer-implemented language-learning tools that include computer-constructed UMDSs. Such tools are useful for learning a second language as well as improving performance in a first language. A language-learning tool may be used for the study of logographic and alphabetic languages. The inventor has recognized limitations of conventional language-learning systems, and has conceived of and developed methods, dynamic computer-constructed data structures, and functionality that can improve the efficiency of learning a foreign language with such tools and also increase the flexibility and usefulness of such tools. The described improved language-learning system supports off-line study on a personal computing device, personalization of studied subject matter and automated feeds for study text, on-line tutorial sessions, on-line social learning, and collaborative development of study text.

In overview, an improved language-learning system can develop a dynamic "UMDS" for each user that uses the system based upon each user's interactions with the system. The UMDS is a time-dependent, computer-constructed data structure that tracks how well a user comprehends different translation aspects for each word and phrase studied and used by the user and how well the user retains the translation aspects as a function of time. To build a UMDS, the system may evaluate data input into a language-learning tool by the user (e.g., correct and incorrect recognitions of all words and phrases presented to the user, requests for assistance with a word or phrase, etc.) and record times associated with the data input by the user. Data analysis for building a UMDS need not occur only when a user is being tested on certain words. Data analysis may occur whenever a user composes or translates words or phrases using the system (e.g., when communicating with another person via electronic mail or a chat session). Because the UMDS is time dependent, it is predictive and can be used to affect operation of the system to better match the user's comprehension or proficiency level, and improve the efficiency at which a user learns a second language. For example, based on the UMDS, the system can determine at what times words and phrases should be presented to the user to refresh the user's memory. The system can avoid unnecessary use of CPU and human time and data transmission bandwidth associated with quizzing the user on words and phrases well-known to the user or presenting translatable items that are either too difficult or too easy to the user. The system can also filter text presented to the user for translation to better match the user's ability, so that the user is neither bored nor frustrated with the translation text.

Among other things, the inventor has recognized that some conventional language-learning tools offer only audio/verbal instruction. As a result, a user may become proficient at hearing and speaking a foreign language, but may not become proficient at reading and writing in the foreign language. Often with such tools, the user stops studying the second language after reaching a minimally-conversant level of proficiency.

Some conventional language-learning systems offer both audio/verbal and written instruction following a standardized course of study, so that a user may gain both verbal and written proficiency in the foreign language. The material for such conventional language-learning systems is typically static and predetermined by an unrelated party. The inventor has appreciated that some of these conventional language-learning systems offer on-line sessions with assistants, but these sessions must be scheduled and are typically scheduled for an extended period of time, e.g., one hour. The inventor has further appreciated that these systems offer conventional user testing, where a single test score may be computed for a group of translatable items presented to the user.

Although such conventional computer-implemented, language-learning systems can be effective for introducing a user to a second language and developing a minimal or moderate level of comprehension in the language, the inventor has recognized that many users stop using the systems after achieving basic or moderate levels of proficiency. The users often do not develop a high level of proficiency or become fluent in the language using such conventional tools.

The inventor has recognized and appreciated that one shortcoming of such conventional tools is their allowance for "comprehension gaps." One type of comprehension gap, a "self" comprehension gap, may exist with a user. A user, having studied translatable text at time A, may think he comprehends more at time B than he actually knows at time B. A second type of comprehension gap, an "interactive" comprehension gap, may exist between a user and an assistant or other person. An assistant (e.g., when meeting a user for an on-line study session) may not know what the user comprehends well and does not comprehend. In the case of an interactive comprehension gap, on-line sessions may be inefficient because valuable time may be consumed while the assistant tries to figure out the user's level of comprehension and better tailor the session to the user. Further, an assistant that incorrectly assesses or assumes a level of comprehension for a user may begin using words and/or sentence structures unknown to the user without realizing the user's inability to understand the discussion. This can result in the user becoming confused and, in some cases, losing interest in the session so that the user stops acquiring new language skills. As a result, the on-line time can be wasted.

Also, the passage of time can affect what a user knows and does not know in a second language, and this can vary on a word-by-word and translation-aspect-by-translation-aspect basis as well as vary between users. For example, some words or phrases may be retained better than other words or phrases. Testing a user on words and phrases that are well-known to the user is a less efficient use of CPU and human time and data bandwidth (e.g., when administered over a network) than testing the user on words and phrases that are less well-known to the user.

To reduce problems associated with comprehension gaps, the inventor has conceived of methods and related apparatus for constructing and maintaining a time-dependent UMDS for each user. For an improved language-learning system, a UMDS may comprise a plurality of memory representations, one for each translatable item and translation aspect that a user has studied, and comprise associated data such as memory parameters, proficiency values, algorithms, referencing or identifying data, etc. User-memory data structures can be incorporated into or otherwise combined with computer-implemented, language-learning programs to provide highly accurate and detailed snapshots of a user's proficiency in a second language or first language, as the user studies the language. Data compiled from a UMDS can be rendered directly (e.g., as confidence values for translatable items) or indirectly (e.g., as color-coded text) for viewing by assistants, study-mates, and/or by the user to instantly convey the user's current comprehension level, so that on-line instructional or conversational sessions can be more efficiently tailored to the user's level of comprehension than is possible with conventional language-learning systems or traditional classroom settings.

For example, data compiled from a UMDS can rapidly identify what the user knows well, areas where the user may need testing, refreshing, or further study, and may identify words the user does not know (e.g., words the user has not previously seen). Because the user's comprehension level can be immediately conveyed, even short (e.g., 5-minute) on-line immersion sessions can be effective teaching aids for a user. With effective, short, on-line immersion sessions, computer-implemented language-learning systems can be moved out of the realm of extended, scheduled, on-line instructional session to on-demand, enhanced-immersion sessions that may occur over social networks and throughout the day. Studying a second language at times convenient to a user throughout the day may be more conducive in developing fluency in a second language.

The inventor has also recognized and appreciated that greater flexibility would benefit electronic language-learning tools. For example, conventional recordings are substantially inflexible in subject matter that is provided to the user when learning a second language. Conventional computer-implemented language-learning tools often provide a predetermined course of study that offers limited flexibility in subject matter. The inventor has recognized and appreciated that a user may be more motivated to learn a second language when the user can select the subject matter that the user wants to learn.

To improve flexibility of the language-learning tool, the system provides for "self-directed" (also referred to as "first person") learning. For self-directed learning, the user may identify subject matter (e.g., a particular sport, an area of research, etc.) to be studied, and the system may support on-line collaborative development of study text. In some cases, a user may enter translatable items that the user would like to study. An on-line assistant may prepare translations for the translatable items or may assist the user in an on-line interactive session that is relevant to the identified subject matter. In some implementations, a user may identify news feeds or web sites from which the user would like to retrieve text for study. The language-learning system may automatically analyze and filter text and/or audio from the identified sources based on the user's current proficiency level, as determined from the user's UMDS, and retrieve text, associated images, and/or audio that are compatible with the user's current proficiency level.

Because a UMDS is dynamic and time-dependent, the UMDS and the user's proficiency level can change with time even when the user does not interact with the system. For example, if a user does not interact with the system for several days or weeks, time-dependent memory characteristics for concepts or items stored in the user's memory representation data structures will cause changes in proficiency values for the concepts or items. Accordingly, when the user returns to the system, proficiency values for some concepts and items may be significantly different than when the user last worked with the system. The change in the UMDS can cause the system to operate differently (e.g., filter text differently) than when the user last worked with the system. These and other aspects of the invention are explained in further detail below.

III. Improved Language-Learning System Architectures

FIG. 1 is a simplified diagram depicting a computing environment in which a language-learning application having computer-constructed user-memory data structures for users may be implemented, according to some embodiments. A computing device or system adapted for language learning and further adapted to construct a UMDS based on interactions with a user may be referred to as an "improved language-learning system" or a "language-learning system" for brevity.

According to some embodiments, a computing environment 100 may comprise at least a first computing device 130 having a video display 132, a data storage device 110, and a server 120. The computing environment may also include at least one second computing device 140 having a display 142. In some embodiments, the first and second computing devices 130, 140, data storage device, and server may communicate over a network 101 via data links 105. The network 101 may include intermediary devices, such as routers, satellites, repeaters, transceivers, amplifiers, etc. In some cases, one or more devices may communicate over a direct communication link 106. Any of the communication links 105, 106 may be wired or wireless communication links. Although FIG. 1 shows only two computing devices 130, 140, a single data storage device 110, and a single server 120, a computing environment 100 may include hundreds, thousands, or more of such devices.

In various embodiments, the first device 130, "user device," may be operated by a user who is learning a second language or desiring to improve his vocabulary in a first language, and the second device 140, "assistant device," may be operated by an assistant or other person that may assist the user in learning the second language or increasing his vocabulary. Either or both of the first device 130 and second device 140 may comprise a consumer-electronic device having a programmable microprocessor, a data-storage device, any suitable user interface, and may include hardware and software for communicating over a network or with at least one other device. Either or both of the first device and second device may comprise a portable computing device, for example, a smart phone, tablet, pad, smart watch, laptop computer, or a personal digital assistant in some embodiments. In some implementations, the first device and/or second device may be a personal computer or other computing device. In some implementations a first device 130 and a second device 140 may communicate directly to each other over a data link 106, and may, or may not, be connected to a network 101. Either or both of the first device and second device may include some or all components described in connection with FIG. 2B.

The term "computer" may be used to refer to a basic or conventional computing device that can perform acts of basic arithmetic (e.g., calculator functionality) and basic word processing common to a majority of consumer-electronic computing devices. A computer may include basic spreadsheet functionality, and may be configured to communicate over the Internet (e.g., include web browser software and internet modem hardware). An example of a conventional computer is an HP ProBook 450 G1 laptop computer, available from Hewlett-Packard, Inc. of Palo Alto, Calif. This computer may be purchased with an Intel Core i5-4200M Processor 2.5 GHz and Microsoft Windows 7 Professional 64-bit operating system. A computer that is specially adapted with machine-readable instructions to perform specific functionality (e.g., improved operation and functionality associated with computer-constructed, user-memory data structures) that is not currently available for consumer-electronic computing devices is a specially-purposed machine and not a conventional computer.

A data storage device 110 may comprise a single data storage device, or a plurality of data storage devices connected to a network 101. A data storage device 110 may comprise a on-line data-storage facility in some implementations. There may be one or more intermediary devices (not shown) connected between a data storage device that help manage the storage and retrieval of digital data to and from the data storage device. In some embodiments, a data storage device may be operated to store and retrieve user-memory data structures for one or more users using an improved language-learning system. Data storage devices 110 may be located on-site (e.g., on a university or business campus), or may be distributed at various geographic locations throughout the world. In some implementations, a data storage device may be combined with or incorporated as part of a server 120.

A server 120 that has been configured to implement improved language-learning functionality according to the present embodiments may include at least one data processor or computing device that has been adapted with specific machine-readable instructions to construct UMDS's and execute improved language-learning functionality according to the embodiments described herein. A server 120 may comprise one or more servers 120 in a server farm, and may be configured to transmit and receive UMDS and associated data structures to and from client devices distributed in a network 101. In some implementations, a data storage device 110 may be connected to a server 120 and be managed by the server. A server 120 may include some or all components described in connection with FIG. 2B.

The network 101 may comprise a piconet, micronet, local area network (LAN), medium area network (MAN), wide area network (WAN), or a combination thereof. In some embodiments, network 101 may be the worldwide Internet. In some implementations, a network 101 may be a network associated with a facility, a university, or a company. Connections to the network may be wired or wireless. A network 101 may include connections to other networks, such as a cellular-phone or mobile-device networks that may include one or more transmission antennas and/or relay stations and base stations. There may be one or more firewalls (not shown) located between a network 101 and a local area network of a plurality of devices, such as an enterprise or agency network.

Figure 2A:
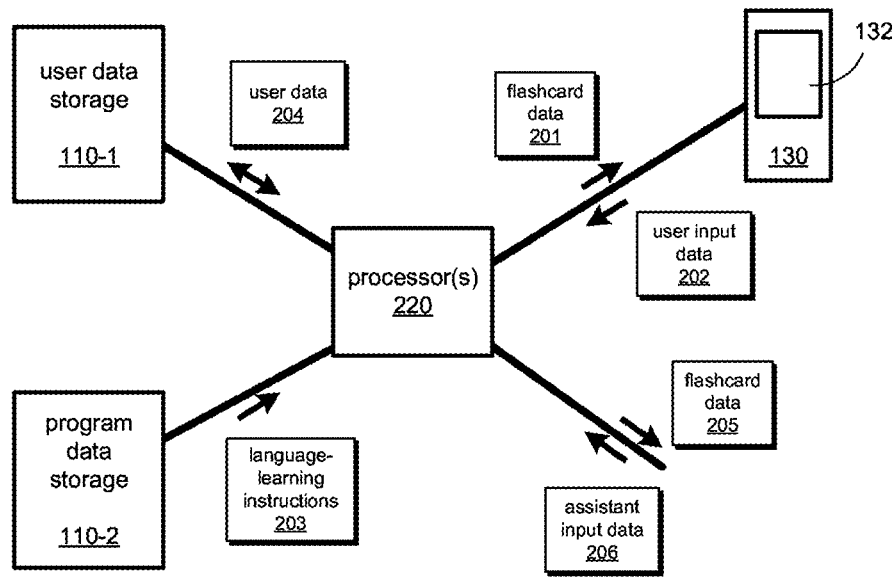
FIG. 2A depicts components that may be active and interconnected in a computing system supporting UMDS's, according to some embodiments.

FIG. 2A depicts various components that may be active in a system or on a device when executing methods of improved language learning, according to some embodiments, and also depicts an example of data flow between some system components. In some implementations, the components may be distributed in a networked system of devices, so that aspects of improved language learning are performed over a network. In some embodiments, the depicted components may be present additionally or alternatively on one device, e.g., computing device 130, so that aspects of improved language learning may be performed on a device that is not connected to a network.

According to some embodiments, at least one processor 220 may communicate with a program data storage device 110-2 on which may be stored machine-readable instructions 203 that, when loaded onto and executed by the processor, specially adapt the processor 220 to construct one or more UMDS's and perform acts of improved language learning. According to some embodiments, a processor 220, may comprise any type and form of data processing device, e.g., any one or combination of a microprocessor, microcontroller, a digital signal processor (DSP), an application specific integrated circuit (ASIC), and at least one field-programmable gate array (FPGA). There may be more than one processor in the system in some embodiments, e.g., dual core or multi-core processors, or plural processors communicating with at least one controlling processor. In some embodiments, one or more functionalities of improved language-learning may be implemented by a dedicated FPGA, DSP, or ASIC. Just one example of a processor is an Intel Core i5-4200M Processor. Another example of a processor that may be specially adapted to implement acts of improved language learning is an Apple A8 system-on-chip processor that is used in smart phones. The program data storage device 110-2 may comprise any suitable form of non-volatile ROM memory or RAM memory or combination thereof.

The processor 220 may also communicate with user data storage 110-1, which may comprise any suitable form of ROM memory or RAM memory or combination thereof. The processor may receive user data 204 (e.g., language data and UMDS data) for a particular user from, and store such data to, the user data storage device 110-1. The language data and UMDS data may be used by the processor to prepare text or flashcard data 201 that may be sent for displaying interactive text or flashcard dashboards on the display 132 of a device 130. Interactive text dashboards or flashcard dashboards may include translatable items and instructional aides for a user as well as statistical information that may be used to evaluate the user's proficiency in the second language. A processor 220 may also receive user input data 202 from a device 130 as a user interacts with the improved language-learning system, e.g., using an interactive flashcard dashboard. The received user input data 202 may be analyzed by the processor to update user data 204, and may be included in text or flashcard data 205 that is transmitted to a second device 140 (not shown) for display. A processor 220 may also receive assistant input data 206 (e.g., from an assistant, friend, or other person granted access to the user), which may be sent with text or flashcard data 201 for display on the first device 130.

Data that is transferred to and from the processor 220 may be in any suitable format. In a network environment, data transferred (e.g., user input data 202, assistant input data 206) may include a header with metadata. The metadata may identify the user and/or user device. In some embodiments, the data transferred to and from the processor 220 may include routing information (e.g., include an IP address for the user device, include GPS information determined by the user device).

In some implementations, a language-learning system may process the metadata or routing information to determine a geographic location of the user or assistant and determine a likely dialect spoken at the user's or assistant's location. In some instances, the metadata may include a dialect identifier that was recorded by the system based on prior interactions with the user or assistant (e.g., based on a user's or assistant's response to a question). Based on a dialect identifier detected by the system for an assistant, the system may record an audio translation from the assistant in a multi-voice data storage structure associated with the dialect. Based on a dialect identifier detected for the user (e.g., a geographic region in which the user may be visiting), the system may provide at least an audio translation from the multi-voice data storage structure that corresponds to the identified dialect.

In some implementations, user input data 202 may include a request for a slowed audio translation. The processor 220 may identify a request to play an audio translation more slowly and may either retrieve an audio translation that was spoken at a slower rate or generate an audio translation having a slower enunciation than a stored audio translation. In some embodiments, a language-learning system may automatically provide to the user audio translations from both male and female speakers.

According to some embodiments, data transfer as described in connection with FIG. 2A may occur in real time during an on-line, network session. During the on-line session, the user device 130 may, or may not, be in communication with a second device 140. In some embodiments, a user may operate a user device 130 off line, e.g., not connected to a network and/or not logged into the language-learning system. The user device may include a local copy of most recently updated language-learning instructions 203 and user data 204 that allow the user device 130 to implement acts of the improved language-learning system (e.g., studying and being quizzed using flashcard dashboards and text dashboards). At least some of the data transfer as described in connection with FIG. 2A may occur locally on the user device 130 during an off-line session. At a later time, the user device may connect on-line with a language-learning server 120, after which updated copies of user data 204 may be uploaded to networked data storage devices 110 of the language-learning system. Also, any queued requests may be uploaded and processed by one or more servers 120 of the language-learning system.

A user device 130 or remote processor 220 may use a UMDS during an on-line session to determine which data should be retrieved from and/or transmitted to student data storage 110-1, user device 130, and/or an assistant device 140. For example, a UMDS may be accessed by a processor 220 to determine which translatable items and/or aspects are not being well-retained by the user. The processor 220 may then determine whether an appropriate time or effective time to present the translatable items and/or aspects to the user for review (e.g., a time at which the user's likelihood of a correct response drops below a predetermined value, such as 70%). If it is determined that the effective time coincides with or occurs prior to the on-line session, the translatable items and/or aspects that are not well retained may be presented to the user for review. In this manner, the amount of information transmitted over the network can be reduced, since well-retained translatable items and aspects need not be presented to the user (as would occur in a static language-learning tool where an entire previous session of information may be retrieved for the user to search through and review the few items/aspects that are not well retained. Selective presentation of translatable items and aspects to a user can reduce the amount of bandwidth needed by a device or network or devices that support(s) language-learning applications.

According to some embodiments, a user device 130 or remote processor 220 may review a UMDS at any time to dynamically maintain user data storage 110-1. For example, if a user device or processor reviews a UMDS and determines that a translation aspect is well retained by the user (e.g., the user's likelihood of a correct response remains above a predetermined value, such as 90%, for a predetermined duration, such as three months), then the translation aspect may be flagged as known, and a majority of data associated with a memory representation for the translation aspect may be removed from the data storage 110-1, freeing up space for new translatable items. Further, computing time associated with maintaining a memory representation for the known translation aspect can be terminated, freeing up computing time for other tasks.

Figure 2B:
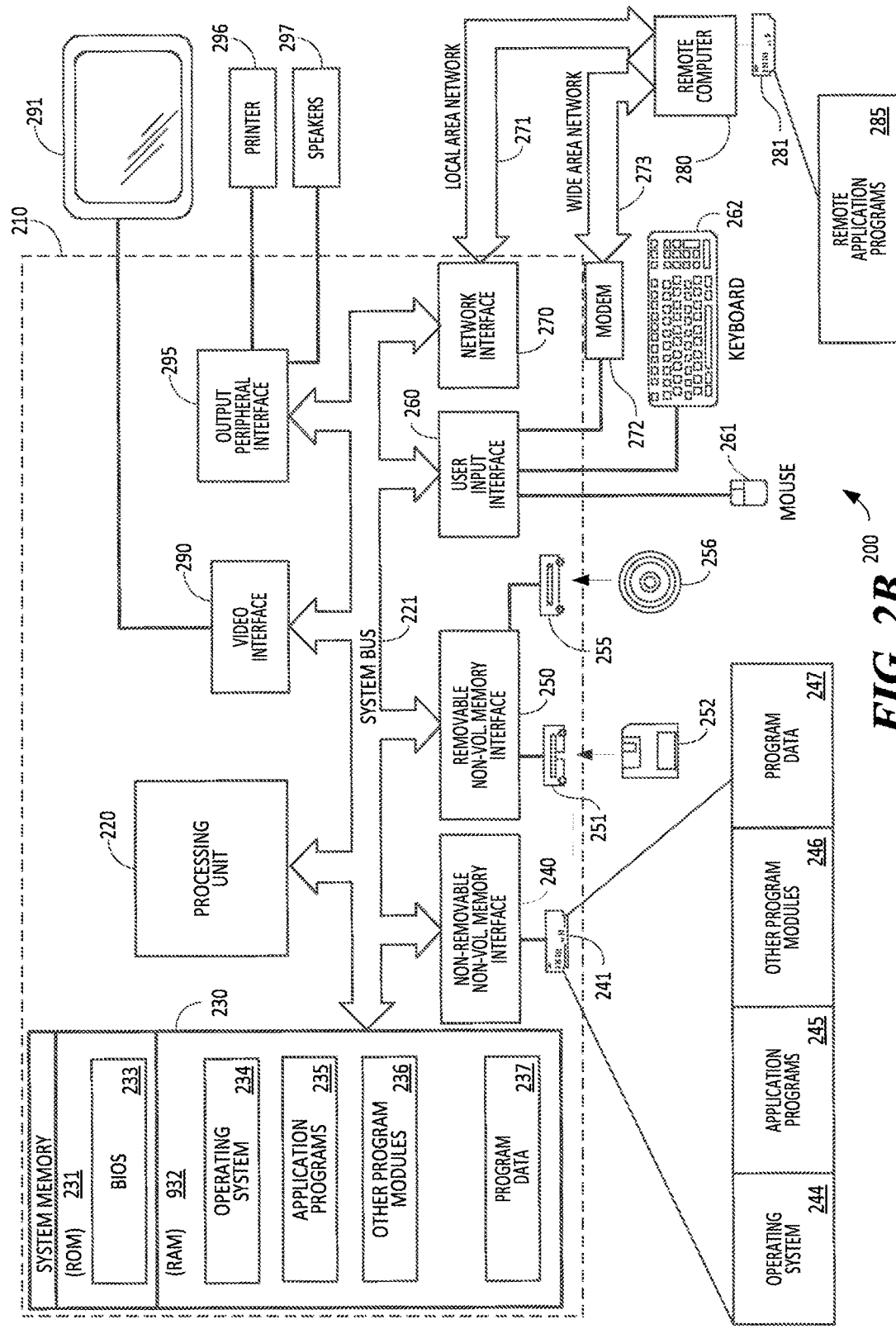
FIG. 2B depicts components that may be included on a device that constructs a UMDS, according to some embodiments.

FIG. 2B depicts components that may be included on a user device 130, assistant device 140, and/or server 120 adapted to construct UMDS's and perform acts of improved language-learning, according to some embodiments. Some or all of the components shown may be present in a device or server. In a distributed computing environment, some components may be located on a server and some components may be located on a client device. In some embodiments, a device for implementing improved-language may include a computing device 210. Components of computing device 210 may include, but are not limited to, a processor 220, a memory 230, and a bus 221 that couples various components including the memory to the processor 220. The bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computing device 210 may include one or more types of machine-readable media. Machine-readable media can be any available media that can be accessed by computer 210 and includes both volatile and non-volatile, manufactured storage media, removable and non-removable manufactured storage media. By way of example, and not limitation, machine-readable media may comprise information such as computer-readable instructions, data structures, program modules, libraries, or other data. Machine-readable media includes, but is not limited to, RAM, ROM, EEPROM, flash memory or other memory-device technology, CD-ROM, digital versatile disks (DVD) or other optical disk storage, magnetic cassettes, magnetic tape, magnetic disk storage or other magnetic storage devices, or any other manufactured data-storage device which can be used to store the desired information, and which can be accessed by computing device 210.

The memory 230 may include computer storage media in the form of volatile and/or non-volatile memory such as read only memory (ROM) 231 and random access memory (RAM) 232. A basic input/output system 233 (BIOS), containing the basic routines that help to transfer information between elements within computing device 210, such as during start-up, may be stored in ROM 231. RAM 232 may contain data and/or program modules that are immediately accessible to and/or presently being operated on by processor 220. By way of example, and not limitation, FIG. 2B illustrates an operating system 234, application programs 235, other program modules 236, and program data 237.

A computing device 210 may also include other removable/non-removable, volatile/nonvolatile machine-readable media. By way of example only, FIG. 2B illustrates a hard disk drive 241 that reads from, or writes to, non-removable, nonvolatile magnetic media, a magnetic disk drive 251 that reads from, or writes to, a removable, nonvolatile magnetic disk 252, and an optical disk drive 255 that reads from, or writes to, a removable, nonvolatile optical disk 256 such as a CD ROM or other optical media. Other removable/non-removable, volatile/nonvolatile machine-readable media that can be used in the exemplary operating environment include, but are not limited to, magnetic tape cassettes, flash memory cards, digital versatile disks, digital video tape, solid state RAM, solid state ROM, and the like. The hard disk drive 241 may be connected to the system bus 221 through a non-removable memory interface such as interface 240, and magnetic disk drive 251, and optical disk drive 255 may be connected to the system bus 221 by a removable memory interface, such as interface 250.

The drives and their associated machine-readable media discussed above and illustrated in FIG. 2B, provide storage of machine-readable instructions, data structures, program modules and other data for the computing device 210. In FIG. 2B, for example, hard disk drive 241 is illustrated as storing operating system 244, application programs 245, other program modules 246, and program data 247. These components may either be the same as, or different from, operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computing device 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices may be connected to the processor 220 through a user input interface 260 that is coupled to the system bus, but may be connected by other interface and bus structures, such as a parallel port, game port or a universal serial bus (USB). A monitor 291 or other type of display device may also be connected to the system bus 221 via an interface, such as a video interface 290. In addition to the monitor, a computing device 210 may also include other peripheral output devices such as speakers 297 and printer 296, which may be connected through an output peripheral interface 295.

A computing 210 may operate in a networked environment using logical connections to one or more remote devices, such as a remote computer 280. The remote computer 280 may be a personal computer, a server, a router, a network PC, a peer device or other common network node, and may include many or all of the elements described above relative to the computing device 210, although only a memory storage device 281 has been illustrated in FIG. 2B. The logical connections depicted in FIG. 2B include a local area network (LAN) 271 and a wide area network (WAN) 273, but may also include other networks. Such networking environments may be commonplace in offices, enterprise-wide computer networks, intranets and the Internet. Network connections may include wired, optical fiber based, or wireless data links.

When used in a LAN environment, a computing device 210 may be connected to the LAN 271 through a network interface or adapter 270. When used in a WAN networking environment, a computing device 210 may include a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in one or more remote memory storage devices. By way of example, and not limitation, FIG. 2B illustrates remote application programs 285 as residing on memory device 281. It will be appreciated that the network connections shown are exemplary and other means of establishing a communications link between one or more additional computing devices may be used.

Figure 3A:
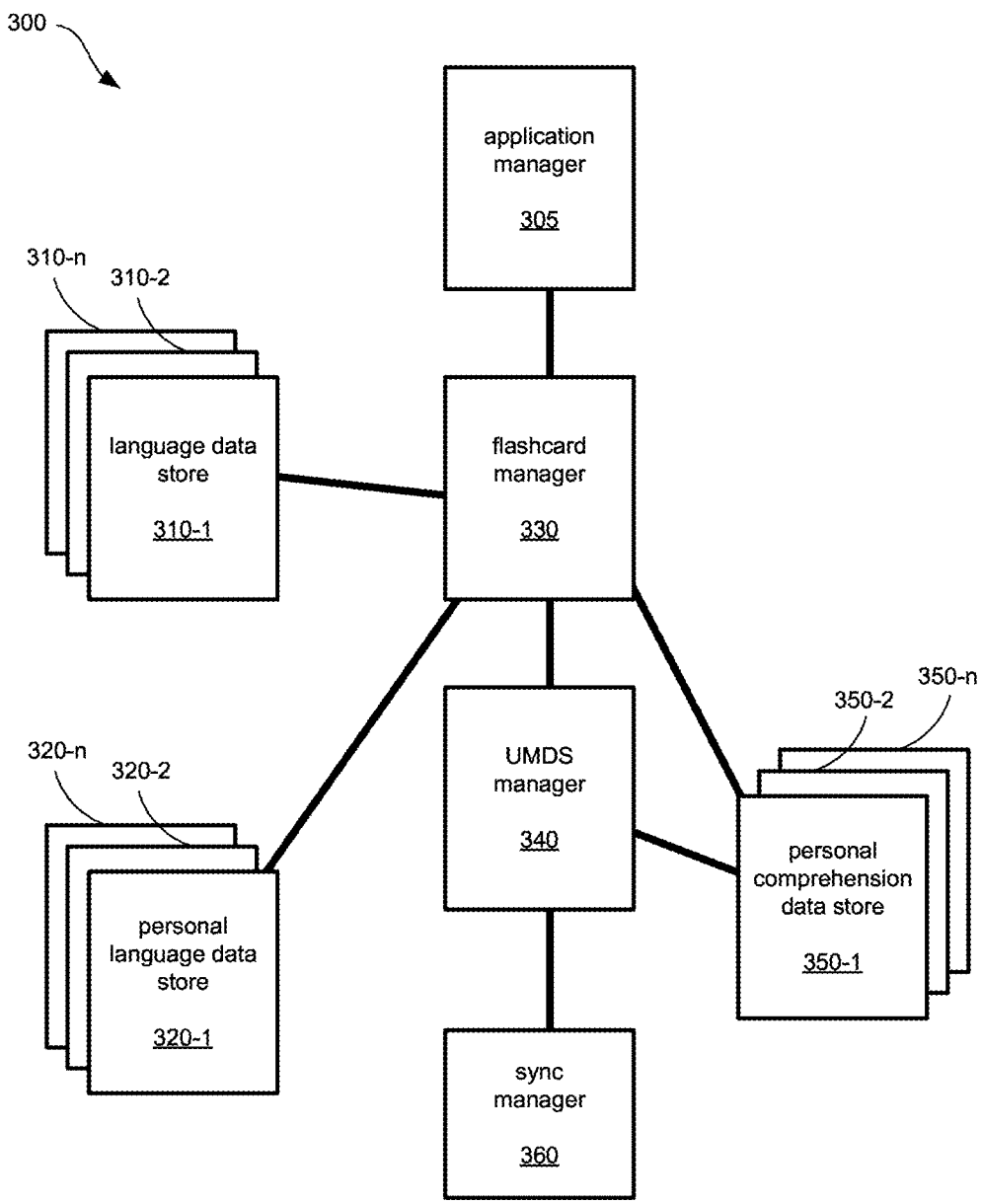
FIG. 3A illustrates application components that may be used to adapt at least one device to implement language-learning functionality with a computer-constructed UMDS, according to some embodiments.

FIG. 3A illustrates application components 300 that may be implemented in a computing device adapted to construct UMDS's and perform acts of improved language learning, according to some embodiments. According to some implementations, an improved language-learning system may comprise a combination of stored data, programming code, and hardware on which the programming code may be executed. According to some embodiments, an improved language-learning system may include an application manager 305, a flashcard manager 330, a UMDS manager 340, and a synchronization manager 360. The flashcard manager 330 may be in communication with language data store 310-1 and personal language data store 320-1. In some implementations, the UMDS manager 340 may be in communication with personal comprehension data store 350-1. Each of the manager components may communicate with each other according to some embodiments and/or communicate with the application manager 305. In some implementations, two or more manager components may be combined in a section of computer code. For example, the synchronization manager 360 may comprise code within the application manager 305 that is executed during operation of the application manager. In some cases, data structures for the personal language data store and personal comprehension data store may be combined and stored together on a common data storage device.

The application manager 305 may comprise machine-readable instructions, hardware (for example, digital logic elements or field programmable gate arrays), firmware, or a combination thereof. As an example, an application manager may comprise machine-readable instructions that may be stored in program data storage 110-2 and loaded onto, and executed by, a processor 220. In some implementations, an application manager 350 may comprise an FPGA (e.g., an array of transistors) configured to perform at least one application manager function described below. An application manager may oversee operation of and implementation of an improved language-learning on a device, and communicate with and/or control other managers of the system. For example, the application manager 305 may oversee and control timing of data exchanges and memory updates within an improved language-learning system. The application manager may oversee launching and closing of an instantiation of improved language-learning on one or more devices. An application manager may also interface with an operating system of a device on which improved language-learning is implemented.

A flashcard manager 330 may comprise machine-readable instructions, hardware (for example, digital logic elements or field programmable gate arrays), firmware, or a combination thereof. As an example, a flashcard manager may comprise machine-readable instructions that may be stored in program data storage 110-2 and loaded onto, and executed by, a processor 220. In some implementations, a flashcard manager 330 may comprise an FPGA (e.g., an array of transistors) configured to perform at least one flashcard manager function described below. In some embodiments, a flashcard manager may receive user data from one or more data storage devices and/or data that is input by a user of the system, and prepare text or flashcard data to send for display on a display of a device on which the language-learning system is implemented. For example, a flashcard manager 330 may receive or retrieve personal language data (e.g., translatable items) from a user's personal language data store 320-1, and prepare the data to display in a flashcard dashboard on a display of a device operated by a user, an assistant, and/or other person having access to the user's data stores. The displayed flashcard dashboard may be an interactive display (such as a dashboard, panel, gadget, or window) with which the user may work on or study the translatable item.

A flashcard manager may receive data for text or flashcard dashboards and associated data structures from additional or alternative sources, e.g., a language data store 310-1, a personal comprehension data store 350-1, and from user and/or assistant input. For example, a user may request translation data from a language data store 310-1 for a particular language. A language data store may be accessed for words or phrases that are newly presented to a user responsive to a user requesting a translation. A flashcard manager may prepare data received from any source for display with a text or flashcard dashboard or summary dashboard.

A language data store may comprise a collection of words and phrases translated between two or more languages, e.g., a collection of digital foreign-language dictionaries that may be cross-translated. For example, a first language data store 310-1 may comprise words and phrases (including text and audio representations) in English, a second language data store 310-2 may comprise corresponding words and phrases in French, and an $n^{th}$ language data store 310-n may comprise corresponding words and phrases in Chinese. A language data store may be maintained on-line, e.g., stored in networked data storage devices 110, and serviced by one or more servers 120. In some implementations, a language data store, or portions of a larger language data store, may be stored on a local device, e.g., a personal computer or other device with sufficient memory space.

Figure 3B:
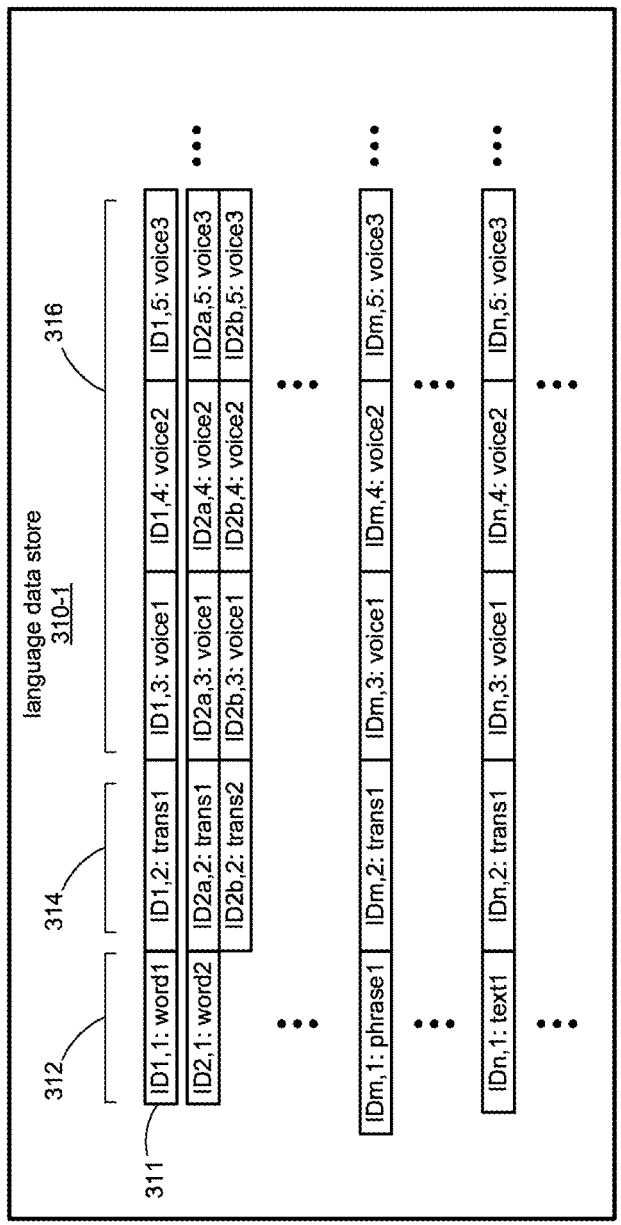
FIG. 3B depicts just one example of a multi-voice data structure, according to some embodiments.

For an improved language-learning system that includes multi-voice translations, a language data store may further include multiple audio translations for one or more translatable items in the language data store. An example of a multi-voice data structure of a language data store is depicted in FIG. 3B, according to some embodiments. A multi-voice data structure may be organized as a data record, data table (e.g., a look-up table), relational database, associated data files, or in any other suitable data-storage paradigm retained in one or more memory devices. According to some embodiments, a multi-voice data structure may include a plurality of words, phrases, and texts 312 in a second language and their corresponding text translations 314 in a first language. Text translation data 314, in some instances, may be filled in by a user or assistant as the user works on translating text via a study-text dashboard. In some implementations, text translations 314 may be filled in automatically by the language-learning system from on-line dictionaries, for example. One or more entries 312 may include multiple audio translations 316 that convey different pronunciations or enunciations of the corresponding word, phrase, or text in the second language. In some implementations, an entry 312 may have multiple text translations 314 (e.g., depending on context or intonation of the word) and corresponding multiple voice translations 316.

In some cases, an entry for a word or phrase in a second language may be stored as a rows 311 of items in a database table. An entry 312 in the second language may have a unique identifier (denoted ID1,1) such as an alphanumeric string, pointer, or memory address that is used to locate the word, phrase, or text in the memory device storing the data. Other entries associated with a word, phrase, or text may also have identifiers (e.g., alphanumeric strints, pointers, memory offsets, memory addresses) such that they are associated with the corresponding word, phrase, or text in the second language. In some instances, a text entry and its associated translation and multi-voice translation may be stored as one or more files. The one or more files may include unique file identifiers (e.g., in a header) that are used to associate a text translation 314 or audio translation 316 with a corresponding text 312 in the second language.

An improved language-learning system may also include data structures, similar to that depicted in FIG. 3B, for a user that translates text from the user's first language into the second language. In such instances, the system may provide the text translation data 314, and the user may fill in the text data 312 as the user works on the text. In some implementations, the user or assistant may also record an audio translation 316 once the text has been translated into the second language.

In some implementations, a flashcard manager 330 may access a personal language data store 320-1 for a user or user. An improved language-learning device may maintain digital "personal language" data records for each user that contains translatable items studied or worked on by the user. For example, a first personal language data store 320-1 may include all translatable items (with French-English translations) studied by a first user. A second personal language data store 320-2 may include all translatable items (with French-Chinese translations) studied by a second user. An $n^{th}$ personal language data store 320-n may include all translatable items (with German-English translations) worked on by a first interpreter. After a user studies or works on translatable items, corresponding data may be stored to the user's personal language data store. This data store therefore keeps a record of what has been presented to a user and what the user knows or has studied. The data store also maintains a status of flashcard data structures or study-text data structures on which the user or user is currently studying or working on, so that the study or work can be suspended (e.g., storing a current version by the flashcard manager 330) and resumed (e.g., retrieving a last updated version by the flashcard manager 330) at disjoint times. Additionally, data from a user's personal language data store and data from a user's personal comprehension data store may be compiled to indicate a proficiency or proficiency summary of the user in the second language.

A UMDS manager 340 may comprise machine-readable instructions, hardware (for example, digital logic elements or field programmable gate arrays), firmware, or a combination thereof. As an example, a memory manager may comprise machine-readable instructions that may be stored in program data storage 110-2 and loaded onto, and executed by, a processor 220. In some implementations, a memory manager 340 may comprise an FPGA (e.g., an array of transistors) configured to perform at least one memory manager function described below. A UMDS manager may run in the background when a user is using the improved language-learning system (e.g., working with flashcard dashboards and text dashboards), and track the user's interactions with the system to develop and update UMDS data descriptive of the user's memory characteristics and current proficiency in the second language. For example, the UMDS manager may keep track of correct and incorrect translations and the time at which correct and incorrect translations are provided by a user to develop time-dependent memory representations for the user for each word or phrase studied by the user and for each translation aspect. In some implementations and after development of a memory representation for a particular word, for example, the UMDS manager may dynamically calculate one or more proficiency values for the user for that word based on the memory representation and temporal data. The UMDS manager 340 may be in communication with a personal comprehension data store 350-1 for a user, where UMDS parameters and/or proficiency values for the user are stored and updated. The personal comprehension data store may comprise a UMDS data record for each user that uses the improved language-learning system.

In some embodiments, a personal language data store 320-1 and a personal comprehension data store 350-1 may be combined into a single data storage location. In some implementations, either or both of a personal language data store 320-1 and a personal comprehension data store 350-1 may be stored in a networked data storage device 110 and/or locally on a user device 130.

A sync manager 360 may comprise machine-readable instructions, hardware (for example, digital logic elements or field programmable gate arrays), firmware, or a combination thereof. As an example, a sync manager may comprise machine-readable instructions that may be stored in program data storage 110-2 and loaded onto, and executed by, a processor 220. In some implementations, a sync manager 360 may comprise an FPGA (e.g., an array of transistors) configured to perform at least one sync manager function described below. In some embodiments, a sync manager may maintain up-to-date records for a user, which may entail updating data in a personal language data store 320-1 and/or a personal comprehension data store 350-1. These records may be updated as a user interacts with the language-learning system, or at times that a user logs onto or off from the system, so that a user's proficiency is accurately tracked with each use of the system, for example. In some embodiments, a sync manager may also provide synchronization between connected devices, for example, a user's device 130 and an assistant's device 140, so that the user and assistant may be viewing the same information at substantially the same time on different devices. In some embodiments, a sync manager 360 may cause transmission of at least some of a user's current comprehension data (e.g., proficiency values relevant to a flashcard dashboard or text dashboard shared between the user and an assistant) during an interactive, on-line session, so that the assistant can readily view and evaluate the current proficiency level of the user for translatable items on the shared dashboard.

IV. Aspects and Features of an Improved Language-Learning System

According to some embodiments, an improved language-learning system comprises at least one computing device configured to display flashcard and text user interfaces which are used by a user to input translation data to the computing device while the user studies and learns a second language. Based upon the user's input, an improved language-learning system can construct a UMDS for the user which tracks time-dependent memory characteristics of the user on a translatable-item-by-translatable-item and translation-aspect-by-translation-aspect basis. In some embodiments, the at least one computing device may comprise one or more computing devices adapted to communicate over a data communication network.

UMDS data can be used to affect operation of a language-learning device and improve a user's interactions with the device (e.g., determine when translatable items are to be presented to a user, what translatable items are presented to a user, whether new text should be presented to a user, when flashcards no longer need to be studied by a user), and to determine GUI properties that quickly and visually inform the user, or an assistant, of the user's current proficiency for displayed translatable items. Values or indications (e.g., time-dependent likelihood of correct responses, color-coded text) representing the user's proficiency that are displayed by an improved language-learning system are more accurate than proficiency values obtained by conventional language-learning systems (e.g., correct or incorrect values, test scores).

Data compiled from a UMDS can be shared directly (e.g., as proficiency values for translatable items) or indirectly (e.g., as color-coded text) with others or presented to the user to instantly and visually convey the user's current comprehension level for multiple translation aspects on a word-by-word basis. By sharing information from a UMDS, on-line instructional or conversational sessions can be more efficiently tailored to the user's level of comprehension than is possible with conventional language-learning systems or even traditional classroom settings. Information displayed by the system that is based on the UMDS can be used to reduce an "interactive comprehension gap" between an assistant and the user, and a "self-comprehension gap" between a user's own estimated and actual comprehension levels.

A UMDS may be used by the system and/or a user's off-line device as a predictive tool. The language-learning system can use data from the UMDS to predict, on an item-by-item basis, how well that user may recognize a translatable item at a future time. The UMDS can then be used to automatically schedule quizzes or presentations of translatable items to the user. For example, the system may use the UMDS to schedule a time to present translatable items to that user to refresh the user's memory.

According to some embodiments, a language-learning system also includes multi-voice, audio translations that can aid a user in learning a second language. For example, the system may store and provide a plurality of audio translations of a word or phrase, as depicted in FIG. 3B. The multiple translations may sound different from each other (e.g., have different pronunciations due to different dialects, be recorded from speakers of different sex, be drawn out over a longer period of time, have different accents as may occur for non-native speakers). The system may provide one or more of the multi-voice translations to a user responsive to a request from the user (e.g., to replay an audio translation more slowly, to play an audio translation indicative of a region of a country in which a user may be visiting). An example of computer code for implementing multi-voice audio is given in Appendix I. Multi-voice translations provide another aspect of an improved language-learning system that can aid a user in learning a language more efficiently using a computing device.

Other features of the language-learning system include self-directed learning, which may be referred to as "first person" operation. According to some embodiments, an improved language-learning system is configured to accept study text entered by the user and considered to be important by the user rather than present predetermined translation text considered by others to be important for the user. The study text may be retrieved by the user from any suitable source (e.g., copied from an on-line article or other publication) or typed into a user interface by the user. In some embodiments, an improved language-learning system can automatically search for on-line subject matter in an area of interest identified by the user and in a second language. Subject matter identified from the on-line search may be filtered by the language-learning system based on the UMDS. For example, text that contains too many unknown translatable items or items not well retained by the user may not be presented to the user. In some cases, study text may be selected for retrieval, storage, and presentation by the language-learning system from an on-line source, where the retrieved text includes mainly words known to the user and words well-retained by the user, with a first predetermined portion of words not well-retained by the user, and a second predetermined portion of new words to the user.

In some implementations, an improved language-learning system may transmit retrieved text, at any time, to a machine translator or an assistant who translates the text and provides an audio rendering of the text. The improved language-learning system may then store the translation and audio rendering for subsequent use in preparing a study-text dashboard for a user. Self-directed learning would benefit individuals wanting to learn a second language in an area of interest or expertise, as opposed to learning language of a standardized instructional program which may have little relevance to the area of the user's interest.

An improved language-learning system may include visual aids that assist a user in learning a second language more efficiently. The visual aids include study-text and flashcard dashboards which can include graphical representations of audio translations, annotations, mark-up, color coding, and point-and-click navigation functionality pertaining to translatable items being reviewed by a user. In some cases, visual aids can allow a user or assistant to quickly see what words should be understood by a user and what words would less likely or not likely be understood by the user and may need further study. Some visual aids may allow a user to quickly zoom to a word or portion of text for further study.

In some embodiments, visual aids displayed by a language-learning tool may indicate immediately to the user, an assistant, or other person different comprehension levels of different words in text displayed to the user. For example, a language-learning tool may color code or otherwise alter text of displayed words based on an analysis of data in a UMDS. For example, a computing device may determine, after analyzing a UMDS, a color for a displayed word that indicates the user's likelihood of correctly recognizing the displayed word.

The present invention includes methods and devices that can improve the efficiency of computer-aided language-learning programs, so that a user learning a second language can achieve greater proficiency in the second language in areas of interest to the user in less time and effort compared to conventional language-learning programs. At least some of the methods may be embodied as machine-readable instructions that can specially adapt at least one computing device to execute improved language-learning functionality. According to some embodiments, a specially-adapted language-learning device may execute improved language-learning functionality on-line in a communication network (such as the Internet) or off-line (e.g., on a personal computing device used by a user). In some cases, for example, a smartphone may be adapted with machine-readable instructions to execute improved language-learning functionality with UMDS's. Further details of these and other aspects of an improved language-learning system are described in the following sections.

V. Examples of User Interaction and Graphical-User Interfaces

According to some embodiments, a user may log onto an improved language-learning system or open an improved language-learning application. The system may display an introductory list of items (e.g., words or dashboard titles in a list, table, menu, or drop-down menu) that the user last worked with when using the system. In some implementations, the listed items may refer to flashcard or text dashboards that the user uses to study the second language or subject matter of interest. The items in the list may comprise hyperlink elements to flashcard or text dashboards. The introductory list of items may identify an author of each item (e.g., user, system, or assistant), when the item was last studied, whether the item was bookmarked, and a completion status of the item. The user may then select an item (e.g., click on or enter an identifier for a flashcard or text dashboard) from the list to study, and then begin working interactively with a dashboard. Although dashboards are described for visual display and user interaction, any other type of user interface may be used in some embodiments (e.g., pop-up windows or panels, web page, frame, etc.)

Figure 4A:
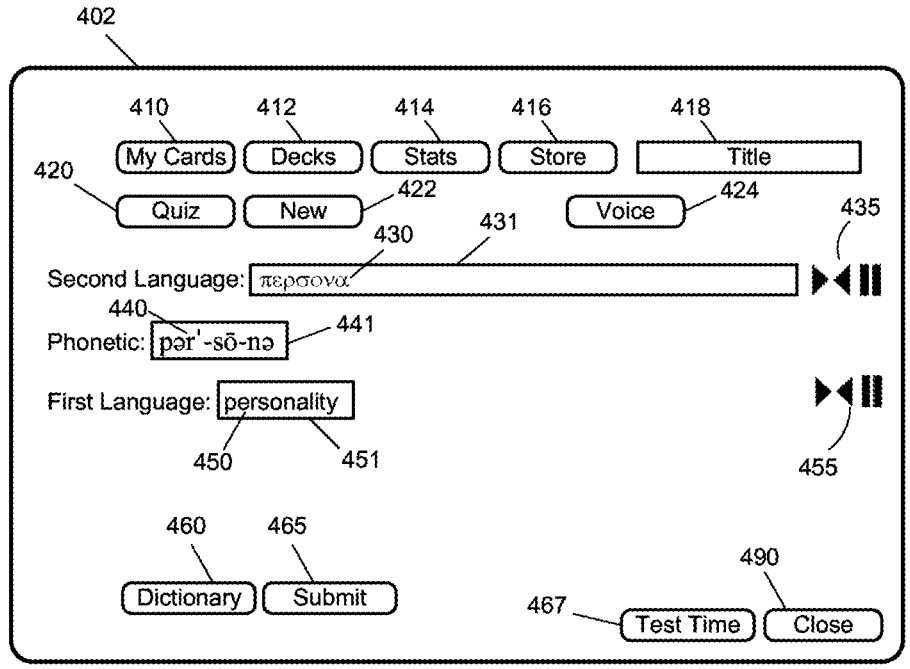
FIG. 4A depicts a user-interactive flashcard dashboard, according to some implementations.

FIG. 4A depicts just one example of an interactive flashcard dashboard 402 that may be used by a user in an improved language-learning system. A flashcard dashboard 402 may comprise a visually-displayed, graphical-user-interface panel, dashboard, window, or page that may be rendered on a display 132, 142 of a computing device 130, 140. The display may comprise any suitable display (e.g., an LCD display, an LED display, a plasma display, a CRT display, etc.) In some implementations, the display may be a touch-screen display that senses a user's touch and that is used by the device to detect user selection of displayed elements of a flashcard dashboard and data entry into a flashcard dashboard. Though, in some embodiments, selection of flashcard dashboard elements and data entry may be performed by other methods, e.g., mouse input operations, keyboard operations, voice commands, etc.

A flashcard or text dashboard may be prepared in part by a flashcard manager 330, for example, by assembling text or flashcard data 201 that will determine the appearance, information, and interactive capabilities of a displayed text dashboard or flashcard dashboard 402. Flashcard or text data may comprise language data, user proficiency values, audio data, and translatable items that are stored and/or retrieved by the language-learning system, as well as display commands that may be interpreted by a device 130, 140 to generate a graphical rendering of the flashcard dashboard. In some embodiments, flashcard data may further comprise template data that is common to different types of flashcards and that may be stored on a device (e.g., a server or user device). In some implementations, the language-learning system may store a flashcard data structure or text data structure associated with each flashcard and text dashboard that the user uses. Flashcard or text data, when processed for graphical display by a device, may generate a user-interface panel or dashboard appearing like the illustrations in FIGS. 4A-5B. Flashcard and text dashboards may be configured to display translatable items as well as prompt and receive user input. In various embodiments, a flashcard or text dashboard may be used by a user to study, and be quizzed on, one or more translatable items associated with the flashcard or text dashboard.

As just one example, flashcard or text data may comprise elements of a widget that can be launched on any one of Apple Inc.'s Mac operating systems that supports widgets. Flashcard data may comprise hypertext markup language (HTML) code, cascading style sheets (CSS) code, and/or javascript code. The included code may comprise instructions relating to the style of the dashboard and instructions for receiving user input through text boxes, active buttons, tabs, etc. There may be one or more files or data structures prepared for each flashcard or text dashboard when a flashcard or text data is prepared and that are used when the flashcard or text dashboard is displayed. Data retrieved for a dashboard or other user interface and received via a dashboard or other user interface may be read from and stored to files on the language-learning system using conventional file open, read, write, and close commands.

In some embodiments, code for displaying a flashcard may comprise a function that is called from a main program executing on a processor. Parameters may be passed to and from the function when called (e.g., an identifier for a type of flashcard, and identifier for a user, and identifier for a data record in a user's language data store 310-1, translation data input by the user via the dashboard, user selection(s) of active buttons or menus on the dashboard, etc.). The function may include code for formatting retrieved data, calculating a user's current proficiency values associated with displayed text, and displaying text and other renderings of relevant data in a flashcard on a display.

Flashcards may be displayed in any suitable form. According to some embodiments, a text or flashcard dashboard 402 may include active buttons (e.g., menu tabs 410, 412, 414, 416 that can alter the dashboard display, a "quiz" button 420, multi-voice button 424, audio buttons 435, 455, etc.) as well as information display regions and data entry regions. A dashboard may, or may not, display translatable text 430 in second language in a translatable text display and data entry region 431, a phonetic pronunciation 440 of the translatable text in a phonetic display and data entry region 441, and a translation 450 of the translatable text in the first language in a translation display and data entry region 451. A dashboard may also contain play, rewind, record, and/or pause buttons 435, 455 for the translatable text 430 and the translation 450.

In some embodiments, translatable text 430 of a flashcard or text dashboard may be pre-selected by the improved language-learning system. For example, the system may access stored data structures (e.g., stored in a language data store 310-1) that include basic vocabulary, basic phrases, grammar rules, and basic sentences that are typically used in introducing an individual to a second language. In some implementations, translatable text 430 for a flashcard or text dashboard may be entered by a user or assistant via a user device 130 or assistant device 140, and associated with a newly-created flashcard or text dashboard for the user.

A flashcard dashboard 402 may be used in at least two different ways. In a first "study" mode, a user may select or create a flashcard that includes a translatable item that the user wishes to study. In this "study" mode, a flashcard dashboard may be first presented to a user in a traditional manner that displays simultaneously translatable text 430, its phonetic pronunciation 440, and its translation 450 into the first language. The user may then study the flashcard dashboard to memorize the translation and pronunciation for the translatable text. In a second "quiz" mode, a user may indicate she is ready to be tested on the translatable text, e.g., by activating a "quiz" button 420. The improved language-learning system may then, at a later time that may or may not immediately follow activation of the "quiz" button, present a translatable item associated with the flashcard to the user and prompt a translation from the user.

In some embodiments, a text or flashcard dashboard may include other buttons. For example, a flashcard dashboard may include a "flag" button that a user may activate to indicate that translatable text of the flashcard is important to the user, and should be learned by the user. A flagged flashcard may appear differently in a list of flashcards that the user has studied, or may have a distinguishing symbol (e.g., a flag or asterisk) associated with the flashcard title in a list. As another example, a flashcard dashboard may include a "hide" button that a user may activate to hide first language or second language displays, so that the user may quickly test himself and toggle the translations back and forth.

According to some embodiments, a flashcard or study-text is flagged automatically by the language-learning system when first created for a user. In some implementations, a flashcard or study-text may remain flagged until the language-learning system determines that the information on the flashcard or study-text has been learned to a satisfactory level, as determined by a memory representation for the flashcard or study-text. For example, if the language-learning system determines, based on a user's memory representation, that the user will correctly translate any translatable item of the flashcard or study text with a probability above a predetermined threshold (e.g., >70%) for an extended period of time (e.g., >4 weeks), the system may automatically remove the flag from the flashcard or study-text. If at a later time, the language-learning system determines, based on the memory representation, that the probability of a correct translation for any translatable item falls below the predetermined threshold, the system may automatically re-flag the flashcard or study-text so that it can be automatically presented again to the user for study.

A text or flashcard dashboard 402 may include a "card" button 410 that may be activated by a user to select a listing of flashcards and/or study-texts that have been studied by the user. In some implementations, the user may select (e.g., by touch, mouse click, voice command, etc.) one of the flashcards or study texts from the list for display and study. Flashcards and study texts may be identified by a distinctive title 418, which may be displayed in a listing of flashcards and study texts. The title may be edited by a user via the flashcard or text dashboard interface. For a single-word flashcard, the title may be automatically assigned by the language-learning system as the word appearing on the flashcard.

A text or flashcard dashboard 402 may include a "decks" button 412 that may be activated to select a listing of decks. In some embodiments, flashcards and/or study-texts may be organized by a user and associated with different decks that may be titled and organized by the user. For example, a user may store groups of flashcards, arranged by topical subject matter, into associated decks. For example, the improved language-learning system may receive input from a user (e.g., after activating a "new deck" button) to title a deck "first meeting." The user may then associate flashcards with this deck that include words, phrases, or sentences that a person would likely speak when first meeting a stranger. As another example, a user may create a "house" deck that associates flashcards containing words, phrases, or sentences relevant to items found in a home with the deck. There may be tens, hundreds, or more flashcards associated with one deck, and a same flashcard may be associated with more than one deck. A "decks" button 412 may provide a listing of deck identifiers (e.g., deck titles), so that a user may select one of the decks for study.

According to some embodiments, a text or flashcard dashboard may include a multi-voice button 424. When activated, a pop-up window or menu may be displayed. The window or menu may offer a selection of different pronunciations of a studied or selected word displayed on the flashcard. The different pronunciations may comprise audio recordings of the same word corresponding to the same word pronounced by: a male speaker, a female speaker, one or more speakers having one or more regional dialects, and one or more speakers having one or more foreign accents. In some embodiments, the different pronunciations may further comprise audio recordings of the same word spoken more slowly, or audio recordings that are altered to play more slowly to aid a user in audibly discerning different parts of a word.

An aspect of the improved language-learning system is that audio translations 316 of any of the multiple voices are aligned to text 312 that is displayed in a text or flashcard dashboard. A user may, when working with a dashboard, select a portion of the displayed text and input a play command. The play command may play one or more of the multi-voice audio recordings corresponding to the displayed and selected text based upon a user's selection of a voice (e.g., via a "voice" button 424).

In some embodiments, alignment of audio data to text data may be implemented using header data. An example header structure is shown below.

```
{
    "filename": "sound.mp3",
    "isFemale": "1",
    "rangeLength": 731,
    "rangeLocation": 0,
    "sha1": "0309bb8c133a598a428b671d4186b8e934381a0a",
    "syncs": [
```

```
        {
            "endPacket": 124,
            "lengthText": 5,
            "masterChunk": "1",
            "startPacket": 52,
            "startText": 0,
            "textNote": {
                "length": 5,
                "location": 0,
                "original": "Λιωιγ ιν αν απαρτμεντ ισ τοο εξπενσιωε",
                "translation": "Living in an apartment is too expensive"
            }
        },
    ],
    "tags": [
        "#betty"
    ],
    "textSha1": "8166263560746f8c11e2393aeb927ce691b9f95a"
}
```

In this example, the header for a first audio file "sound.mp3" having a first voice may include a reference to a corresponding text file, identified by "textSha1." The audio file may be identified by "sha1." The text in the second language, identified as "original," may start at a location 0 in a text string and have a length of 5 text units. A text unit may comprise one or more characters, phonemes, syllables, words, or symbols. The corresponding audio for the length of text may be located in the audio file beginning at packet 52 and ending at packet 124, if the audio data is stored as packets for example. Additional headers may be included for audio data corresponding to other voices (e.g., male voice, slow reproduction, different dialects, different accents, etc.) Accordingly, a user of the language-learning system may select a text block extending from 0 to 5 text units and input a play command. Audio aligned to the text may then be played on a system speaker from one or more of the multiple voices retrieved from the language data store while the user views the text.

A text or flashcard dashboard 402 may also include a "quiz" button 420 and a "new" button 422, according to some embodiments. For example, the "quiz" button may be activated by a user (user or assistant) to test a user on one or more translatable items on a flashcard dashboard. Responsive to activation of the "quiz" button, the language-learning system may subsequently present the flashcard dashboard to the user with a translatable item, so that the user is prompted to provide a translation to the system. The provided translation may comprise text entered by the user or a voiced response that may be recorded and compared against a prior voice response recorded by the user when first studying the flashcard. The presented flashcard dashboard may show none or at least one of the translatable text 430, the phonetic pronunciation 440, or the first language translation 450. In this manner, a user may be tested on any one of the translation aspects for a translatable item studied by the user.

In some implementations, a test time on a translatable item may be selectable by a user. For example, a user may provide input to the language-learning system (such as in a user "preferences" or "settings" dialogue window, or via a "test time" button 467 on each dashboard) indicating when quizzes on a flashcard or study-text should occur, whether quizzes should be at random times or on a regular schedule, and at what frequency the quizzes should occur. In some implementations, a user may further specify when the quizzes for a flashcard or study-text should terminate (e.g., after one week, one month, two months, etc.).

If nothing is shown on flashcard dashboard 402 that is presented for a quiz, a device user device 130 may automatically play an audio recording of a translatable item or one of the play button's 435, 455 may be highlighted so that the user may activate the highlighted play button. Input received from the activation may cause an audio reproduction of the translatable item in the second language. The user may then enter a text translation in the first language into the translation data entry region 451, or may speak the translation in the first language. A spoken translation may be recorded by the device 130 and compared against a spoken translation recorded when the user first studied the flashcard. Conversely, if the audio prompt is in the first language, the user may speak the translation into the second language. On the other hand, if a translatable text 430 is shown at presentation of the text or flashcard dashboard 402 for a quiz, the user may type the translation 450 in the first language.

According to some embodiments, a translation aspect for which a user is tested may be selected at random, or determined according to a scheduling algorithm based on the user's UMDS, by the language-learning system. An example of a scheduling algorithm may comprise testing the user first and/or most frequently on a translation aspect for which the user typically exhibits a lowest proficiency value across all translatable items. In another embodiment, a scheduling algorithm may comprise testing the user first and/or most frequently on a translation aspect for which the user exhibits a lowest proficiency value for that particular translatable item. The language-learning system may determine the user's proficiency value for any translatable item and translation aspect from the UMDS. In some embodiments, a user may designate which translation aspect, or in which order translation aspects, should be tested.

According to some embodiments, a scheduling algorithm may determine a time at which the user will be tested on a translation aspect, e.g., according to a memory representation for that aspect. For example, the device may determine from the user's UMDS that the user's confidence level (probability of correct recognition or usage) for that aspect will fall below a predetermined threshold value (e.g., 50%) at a future time. The device may then schedule a test on the translation aspect at that time or next-available time when the user operates the device.

While working with a dashboard, a user may consult a dictionary (e.g., a language data store 310-1) by highlighting a word and activating a "dictionary" button 460, for example. The highlighting of a word and activation of the "dictionary" button may provide data input that the language-learning system uses in forming a search query for a translation of the highlighted word. Additionally, a user may record the user's speaking of the translation item and its translation. When finished working with a dashboard, the user may activate a "store" button 416, providing input that the language-learning system identifies as a comment to store the new flashcard or study-text data. Responsive to activation of a "store" button, a flashcard manager 330 may send data associated with the flashcard or study-text to a user's personal language data store 320-1, according to some embodiments.

In some embodiments, the language-learning system may automatically create a flashcard for a user when the user highlights a word of text and searches for a translation of the word in an on-line dictionary. The language-learning system may first determine whether a flashcard exists for the word. If a flashcard exists, the system may re-flag the flashcard. If a flashcard does not exist, the system may create a new flashcard for the user, and automatically flag the flashcard for the user.

Figure 4B:
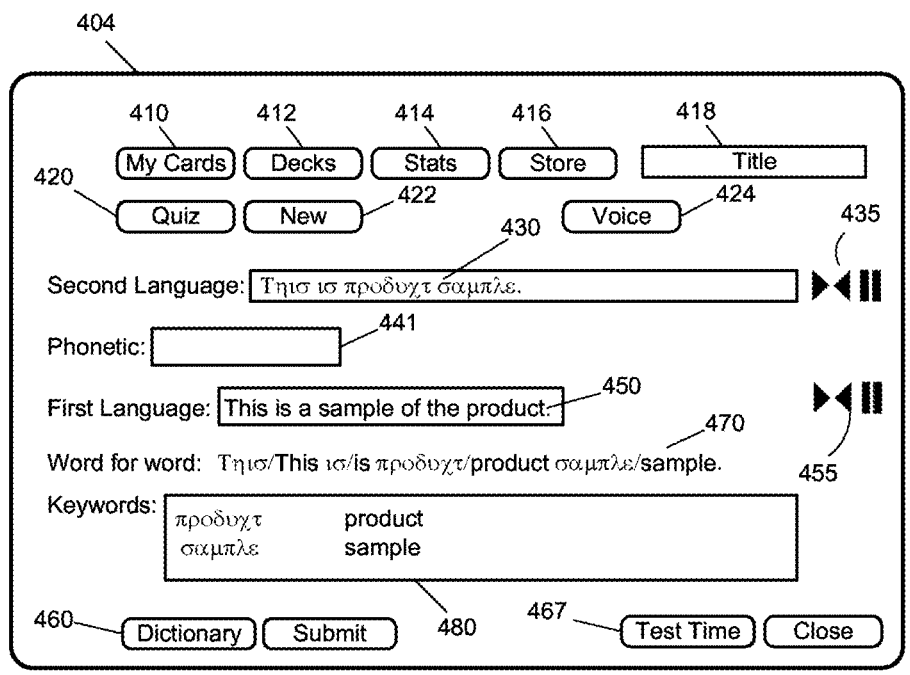
FIG. 4B depicts a user-interactive flashcard dashboard, according to some implementations.

FIG. 4B depicts an example of a flashcard dashboard 404 that may be presented by the improved language-learning system to a user, so that the user may study more than one word of translatable text 430. In this example, the translatable text comprises a sentence, though the translatable text 430 may comprise a phrase or short paragraph in some embodiments. According to some embodiments, a flashcard dashboard may include a word-for-word translation 470 of multi-word translatable text, so that the user may gain some understanding of the phrase or sentence construct and/or basic grammatical rules in the second language.

In some embodiments, a flashcard or text dashboard may include a "keywords" data display and data-entry window 480 in which a user or user may enter (type or copy) one or more keywords from the translatable text 430. In some implementations, a keyword other than a word from the translatable text 430 may be entered (e.g., a word descriptive of the subject matter of the translatable text). Keywords may be associated with the translatable text by the language-learning system for subsequent searching purposes. For example, a user may submit a search query to the language-learning system that includes a keyword. Responsive to receiving the search query, the language-learning system may identify one or more flashcards and/or study-texts from a user's personal language data store 320-1 with which the keyword has been associated, and indicate the one or more flashcards and study-texts on the user's device (e.g., in a list). In this manner, a user may readily obtain one or more examples of how the keyword in the second language is used in a phrase or sentence. Alternatively, the user may readily retrieve words or phrases used in connection with subject matter associated with the keyword. One or more keywords may be entered for each flashcard and study text.

Figure 4C:
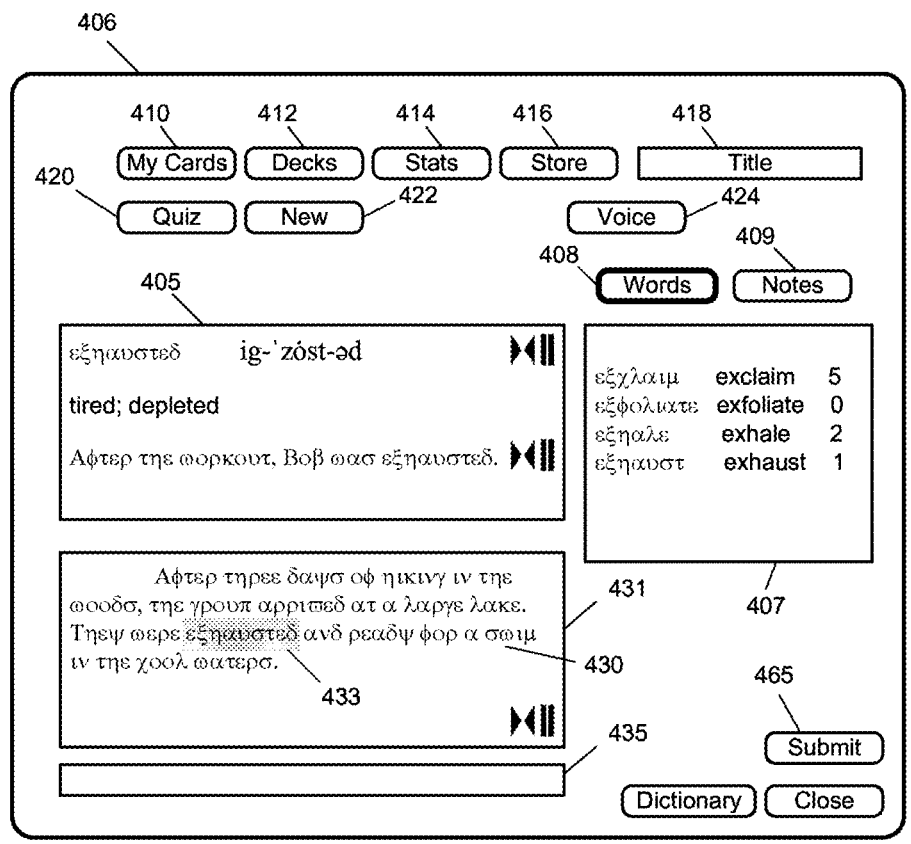
FIG. 4C depicts a user-interactive text dashboard, according to some implementations.
Figure 4D:
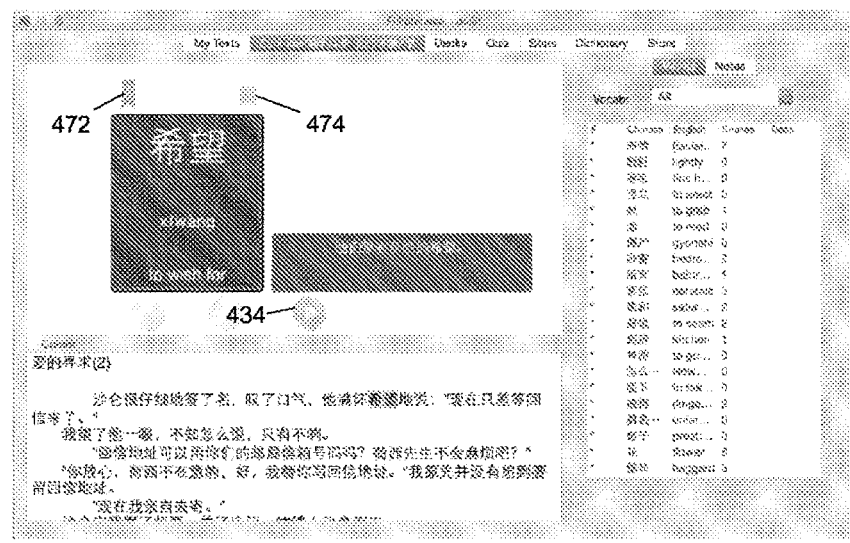
FIG. 4D depicts a user-interactive dashboard that includes a flashcard dashboard, according to some embodiments.

Longer sections of text may be studied using study-text dashboards of the improved language-learning system, according to some embodiments. FIG. 4C and FIG. 4D depict examples of a text dashboard 406 in which a short paragraph of translatable text 430 is displayed for study. Although a short paragraph is shown to simplify the illustration, long paragraphs and multiple paragraphs may be studied using a text dashboard. Code for displaying a text dashboard 406 may be similar to code for displaying a flashcard dashboard, but may include additional parameters and functions used to produce the displayed flashcard and receive data entered by the user. For example, display of a text dashboard 406 may include a subfunction that calculates one or more proficiency values for each word displayed in the study text based upon the UMDS, and alters the display of each word corresponding to the calculated proficiency value(s).

According to some embodiments, the study text in a text dashboard may have been entered by a user (e.g., typed or copied) or by an assistant. As the user works on translating the text in "study" mode, the user may select one or more words in the study-text (e.g., by highlighting the word, placing a cursor on the word, touching the display at the location of the word). The selected word 433 or words may indicate text that the user does not know or is unsure about. According to some embodiments, the user may enter a translation for the word in a translation window 451, or record a translation with the system by voice input. The language-learning system may determine whether the user has provided a correct translation, record the time and result for the translatable item and translation aspect, and provide an indication to the user regarding the correctness of the translation. In some implementations, a user may optionally activate a "dictionary" button to request a translation of a selected word 433. The language-learning system may then provide an extended translation in a dictionary translation window 405. This window may further allow the user to play audio recordings of the selected word 433 and view phonetic translations, as well as additional uses or meanings of the word.

According to some embodiments, a text dashboard may include a "words" window 407 (activated by a "words" button 408 or voice command) that may display a list of translatable items that are similar to selected word 433 identified by the user and that have been previously studied by the user. The listed translatable items may include translations and a number of flashcards and study-texts in which the listed items have been used. The listed translatable items may aid the user in translating the selected word 433. In some embodiments, a user may select (e.g., click on or speak) one of the listed translatable items to navigate to one or more flashcards and study-texts associated with the listed translatable item. The display of similar words in the words window 407 may provide helpful cues to a user for logographic languages. In some implementations, if a user has previously studied the selected word 433, the language-learning system may, at least temporarily, omit the selected word from the listing of words in the word window 407, so that the user can try to deduce the word's translation.

In some embodiments, some of the translatable text 430 may be displayed in different colors by the language-learning system. As one non-limiting example, a majority of the text may appear in a first color, e.g., black. The first color may indicate words in the text that the user should know. For example, the language-learning system may determine from the UMDS that the probability of the user providing a correct translation for words of the first color is above a first predetermined threshold level (e.g., 85%, though other values may be used), and therefore color code these words using the first color. In some implementations, words appearing in the first color may correspond to words of un-flagged flashcards for the user. Some of the words may appear in a second color, e.g., red. The second color may indicate words that the user is currently learning (e.g., there exists a corresponding flagged flashcard) and/or is less likely to provide a correct translation. For example, the language-learning system may determine from the UMDS that the probability of the user providing a correct translation for words of the second color is below a predetermined threshold level, which may be the same as or different from the first predetermined threshold level, and therefore color code these words using the second color. In some embodiments, some of the words in a translatable text 430 may appear in a third color, e.g., green. Words appearing in a third color may be words that the user has not previously seen. For example, the system may determine there may be no corresponding word stored in the user's personal language data record 320-1. By color coding words in displayed translatable text, a user or assistant can, at a glance, determine a difficulty level of the text for the user.

In some embodiments, the language-learning system may determine a level of difficulty of translatable text for a user using the metrics that are used to color code text. The language-learning system may then automatically filter on-line source text or audio according to the user's UMDS, retrieve text from the on-line news or media feed having an appropriate level of difficulty for the user, and provide the discriminantly-selected text to the user. An appropriate level of difficulty may be determined from the user's UMDS and according to a metric set by the user or an assistant. For example and without being limited to particular values, a predetermined rule may be to present text of which 85% should be known by the user above a preselected confidence level (e.g., color code as black text words), 10% may be less well known (e.g., color code as red text words), and 5% may be unknown (e.g., color code as green words). Other ratios may be used in various embodiments.

To automatically retrieve text, the system may include a record (created by a user) of on-line news or other media sources, which have been identified by the user to the language-learning system as sources of media identified as interesting to the user. The system may include instructions to periodically access the on-line sources and analyze text and/or audio from the sources currently presented web pages. The analyzed content may then be filtered by the system, based upon the user's current UMDS data, to determine whether the content should, or should not, be retrieved and presented to the user. For example, the content may be retrieved and presented if it exhibits an appropriate level of difficulty to the user.

In some implementations, an improved language-learning system may be configured to navigate to flashcard dashboards when a user clicks on or otherwise selects color-coded text. For example, the system may navigate to a flashcard dashboard when a user clicks on a word in the translatable text of the first color, second color, or third color. In some cases, the language-learning system may automatically create new flashcards for words the user has not previously seen. In some embodiments, the language-learning system may be configured to additionally navigate to audio translations of color-coded words. For example, the system may navigate to a dashboard that displays an audio trace for the word and playback buttons when a user clicks on or otherwise selects a color-coded word. In some implementations, the language-learning system may be configured to interpret navigation to a flashcard (e.g., by clicking on a word in a study-text dashboard) or navigation to or request of a dictionary translation as a non-recognition or incorrect translation test result and record the time of navigating to the flashcard.

FIG. 4D depicts navigation to a flashcard dashboard within a study-text dashboard, according to some embodiments. A Chinese word "xiwang" has been selected by a user, which causes the display of a corresponding flashcard dashboard in a frame within the text dashboard. The displayed flashcard includes a flag symbol 472 indicating the flashcard is being studied by the user. The displayed flashcard also includes a toggle button 474 that may be activated to toggle the displayed translation to the first language. The displayed flashcard also includes a play button 434 that may be used to play an audio recording of the word.

In some embodiments, a text dashboard 406 may include a "notes" button 409 that, when activated, causes the language-learning system to provide a "notes" window (not shown) in which a user may enter and edit notes regarding the translatable text 430. When a user is finished studying a text dashboard, the user may store and/or close the text dashboard by activating a "close" button 490.

According to some embodiments, responsive to activation of a "new" button 422, the language-learning system may present a blank text or flashcard dashboard 402 to a user, and allow a user to enter data to develop his own flashcard. The inventor has recognized and appreciated that individuals may increase their proficiency in a foreign language when the individuals can designate the text that they wish to learn or speak in a second language. Accordingly, an improved language-learning system is flexible in that it allows a user to select text for study that is of importance to the user. In some embodiments the user may copy or import one or more words from the second language into the translatable text window 431. For example, the user may copy text from a news feed into the translatable text window 431 (if copied in the second language) or into the translation window 451 (if copied in the first language). The user may then begin working on the newly-created study-text or flashcard dashboard, entering translations of the copied text. In this manner, a user can self-direct their study of a second language.

In some instances, a user may not be able to translate text that the user enters or copies into a flashcard or text dashboard or that is presented to a user for study by an assistant or the language-learning system. An aspect of an improved language-learning system is that study-text or flashcard data 205 may be transmitted by the language-learning system over a network 101 to an assistant or interpreter who may assist in the completion of flashcard or text translations. For example, a user may activate a "submit" button 465, providing input that causes the language-learning system to designate a flashcard or study-text for translation assistance. Flashcards and study-texts that have been submitted for translation assistance may be queued by the language-learning system, and sent in chronological order to assistants, interpreter, or others that access the language-learning system. Individuals that assist in translations may be located anywhere throughout the world and assist in the translation at any time.

According to some embodiments, a language-learning server may maintain a data record that identifies on-line language assistants (e.g., IP addresses for individuals who have registered with the language-learning system as language assistants or interpreters). Responsive to receiving a request from a user for translation assistance, the language-learning server may identify an on-line language assistant from the data record using any suitable selection algorithm. A selection algorithm may choose a language assistant based on soonest availability, according to some embodiments. In some implementations, a selection algorithm may choose a language assistant based on a voice or pronunciation feature identified for the language assistant. For example, a language assistant may identify a dialect spoken by the assistant upon registration with the language-learning system. The language-learning server may identify a geographic region from which a translation request is received (e.g., an IP address indicating a region in which a user is travelling), and select a language assistant that speaks a dialect common to that region.

In some embodiments, an improved language-learning system may provide a fee-based translation service. For example, a user or user may submit flashcard or text data for translation as described above, and the language-learning system may provide an expected time of translation to the user. The expected time of translation may be determined by the language-learning system based upon a number of queued submissions and a rate at which queued submissions are being processed. In some embodiments, a user or user desiring a translation sooner than the estimated translation time may be able to charge a translation fee to an account for the user or user that is maintained by the language-learning system. The charging of the fee may guarantee a translation result within a pre-specified time.

Figure 5A:
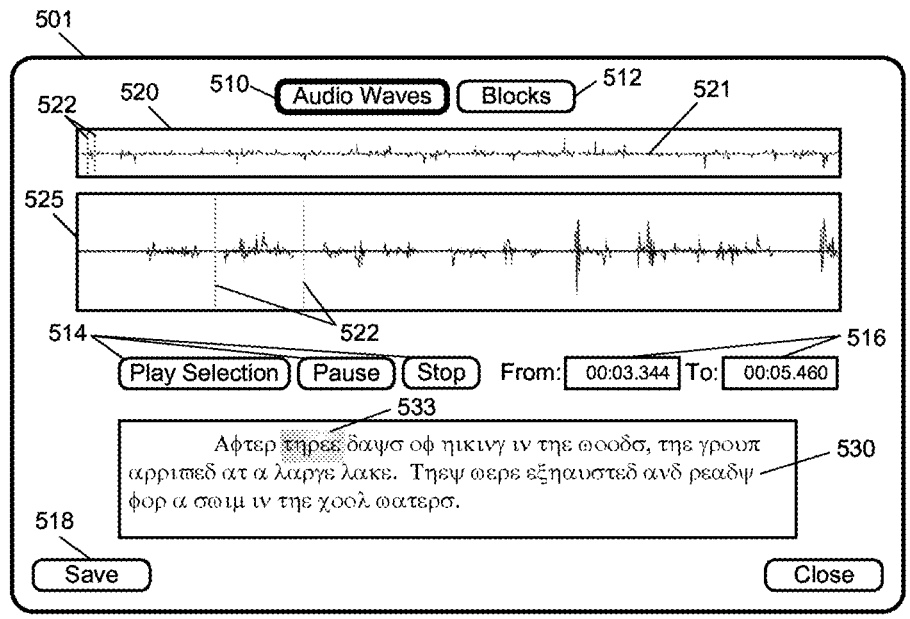
FIG. 5A and FIG. 5B depict user-interactive, editor dashboards, according to some implementations.

FIG. 5A illustrates just one example of an editor dashboard 501 that may be used by an assistant, interpreter, or a user, when editing flashcard or study-text data. An editor dashboard may be prepared by a flashcard manager 330, for example, by assembling flashcard or text data that will determine the appearance and interactive capabilities of a displayed editor dashboard 501. Flashcard or study-text data for an editor dashboard may comprise translatable items entered by a user and identified for translation assistance, and may include translations entered by a user, as well as display commands that may be interpreted by a device 130, 140 to generate a graphical rendering of the editor dashboard 501. The data may be stored by the language-learning system in association with the user. Flashcard or study-text data for an editor dashboard may further comprise audio data that may be entered by an assistant or interpreter, for example. The audio data may comprise recordings of translatable text associated with a flashcard or study-text. According to some embodiments, an editor dashboard 501 may be used by an assistant, interpreter, or user to translate translatable text 530 from a second language into a first language. The editor dashboard may also be used to record an audio translation of the translatable text, and to align the translatable text with the audio recording.

According to some embodiments, an editor dashboard may include an "audio waves" button 510 and a "blocks" button 512. The "audio waves" button, once selected, may cause the display of audio data corresponding to a verbal translation of the translatable text 530. The displayed audio data may be a reproduction of an acoustic signal corresponding to the spoken text as might be detected by a microphone (e.g., a microphone of a computer). The audio data may be displayed in one or more audio wave windows 520, 525. For example, a first audio wave window 520 may display a complete or large portion of an audio trace 521 of the translatable text 530, and a second audio wave window 525 may display a selected portion of the audio trace, e.g., a portion in the vicinity of an audio translation that is currently being played. The selected portion may correspond to a region of the audio recording in the vicinity of a selected text 533 that has been highlighted or otherwise selected by a user. Highlighting or selection of text allows a user to zoom to a portion of text and corresponding portion of audio, once the audio and text are aligned. In some implementations, demarcation bars 522 may be displayed by the language-learning system and adjusted by a user to identify a portion of the audio traces (e.g., a sequence of audio packets in an mp3 file) that approximately correspond to a selected text 533 in the translatable text 530. The editor dashboard 501 may also include active buttons 514 for playing a portion of the audio recording, and time indicators 516 that display time representative of a location in the audio recording at which the selected text appears.

Recording of an audio rendering of translatable text 530 and alignment of the translatable text 530 to the audio recording 521 may be accomplished in any suitable manner. For example, in a first mode of operation, an assistant or interpreter may speak the translatable text 530 and record the audio at a device 140 using any suitable audio hardware (e.g., a microphone and sound card). The language-learning system may associate the recording with a flashcard or study-text data structure for the translatable text, store an audio file having at least one identifier linking the audio file to a corresponding text dashboard, and produce an audio trace 521 that is displayed in the editor dashboard. The audio trace may be a graphical representation of the recorded audio signal.

According to some embodiments, an assistant or other user may then begin a process of aligning the translatable text 530 to the audio recording. For example, an interpreter may first play the audio recording, and click on or tap a word of the translatable text 530 when it has been heard while the recording is being played. Input received from the clicking or tapping may be used by the system to identify approximate locations of separations between words of the translatable text 530 in the corresponding audio file. For example, the clicking or tapping may identify a corresponding audio packet number in a sequence of audio packets in the audio file. The interpreter need not click or tap on every word. The language-learning system may store alignment identifiers, pointers, or time tags for these approximate locations in association with the audio data and study text for subsequent refinement. For example and referring to the audio code associated with the "voice" button described above, the language-learning system may store a "startPacket" number and "endPacket" number associated with a string of text located between a first click or tap and a subsequent click or tap on the displayed translatable text 530.

In a second step, an interpreter may then, on a word-by-word basis, proceed through each, syllable, word, phrase, sentence, or paragraph of the translatable text 530. When a portion of the translatable text has been selected, the demarcation bars 522 may be displayed by the language-learning system in one or both of the audio rendering windows. The demarcation bars may align to the audio wave at the locations where the user clicked. The interpreter may then activate a "play selection" button 514 to confirm that the portion of the audio recording appearing between the demarcation bars corresponds to the selected word of the translatable text 533. Any errors in alignment may be corrected by dragging or otherwise moving one or both of the demarcation bars 522. Such dragging or movement of the bars may provide input to the language-learning system that is used to adjust the location in the audio file to which the alignment time tags, pointers, or identifiers refer (e.g., change the values of the corresponding audio packets). During the second step, the interpreter may add more alignment markers within the selected portion by clicking or tapping on the text when its corresponding audio is heard. Alignment of the added markers may be refined by replaying the text. In this manner the translatable text may be more precisely aligned with the audio transcription 521.

Figure 5B:
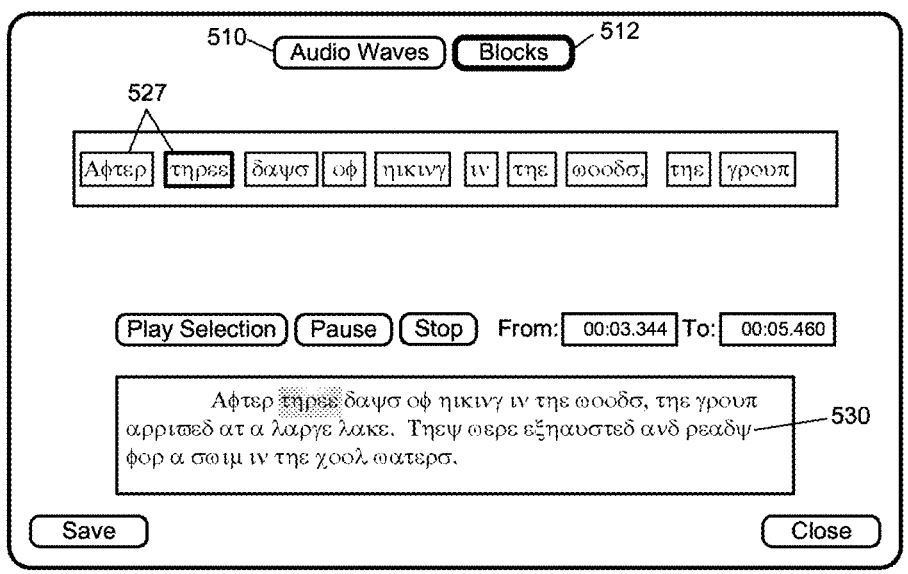

A "blocks" button of an editor dashboard 501 may, when activated by a user, cause the language-learning system to display distinct blocks of meaning of the translatable text 530, as depicted in FIG. 5B. For example, activation of the "blocks" button 512 may cause the editor dashboard to display the translatable text 530 as distinct blocks 527, as depicted in the drawing. An assistant, interpreter, or user may identify distinct blocks of meaning that may have distinct translations. The "blocks" functionality of the language-learning system may be helpful for logographic language translations, where identifying the distinct blocks of meaning may be more difficult than in alphabetic languages. According to some embodiments, an assistant or interpreter may identify blocks of meaning to the language-learning system by selecting (e.g., highlighting) sections of the translatable text 530, and the language-learning system may produce and/or store metadata for the translatable text 530 that identifies the start and end of the highlighted blocks (e.g., a beginning character or symbol and an end character or symbol). In some embodiments, the audio data may be aligned to the blocks of meaning. In some cases, once text, blocks of meaning, and a corresponding audio translation have been aligned, a text flashcard may display the blocks of meaning and a user may select them individually and play a corresponding portion of an audio file for the selected block.

Referring again to FIG. 5A, in some embodiments an alternate "slow" voice for translatable text 530 may be recorded by an assistant by simply speaking the text at a slow speed with clearer enunciation. The slow voice may also be recorded as an audio file, and subsequently aligned to the text 530 and text blocks of meaning as described above. The slow voice may be stored in a multivoice language data store and played back upon request or automatically (e.g., in addition to a playback of a corresponding audio segment for the same text).

Figure 5C:
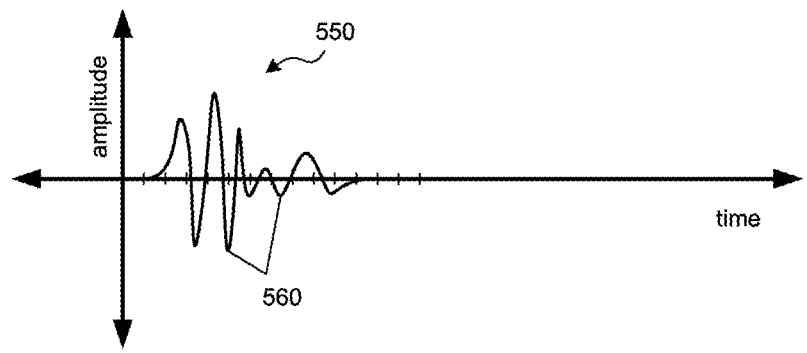
FIG. 5C depicts an audio trace corresponding to an audio translation.
Figure 5D:
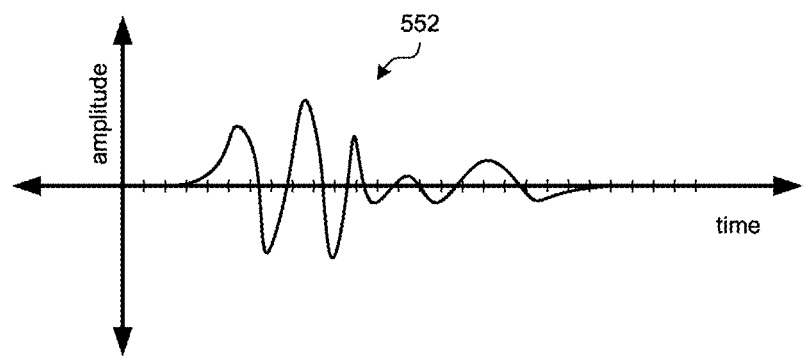
FIG. 5D depicts a slowed audio trace corresponding to an audio translation, according to some embodiments.
Figure 5E:
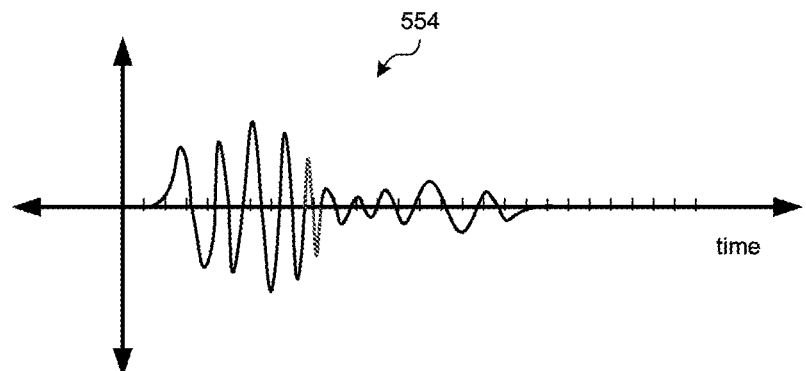
FIG. 5E depicts a slowed audio trace in which segments of the audio data have been repeated to preserve pitch, according to some embodiments.

According to some embodiments, a language-learning system may automatically generate a "slow" voice from a recording at a normal speed. To do this, the system may repeat portions of an audio waveform, as indicated in FIG. 5C through FIG. 5E. FIG. 5C depicts a graphical representation of an audio waveform, which may correspond to a syllable or word, for example. The plotted trace may represent an amplitude of sound as a function of time. If, upon playback, a device 130, 140 were to play the recorded data more slowly, as depicted in FIG. 5D, the oscillation frequencies would be shifted to longer wavelengths, as can be seen from the graphs. This would lower the pitch of the sound, and make it unrealistic to the listener.

To avoid a lowering of the pitch, the language-learning system may reproduce portions of the audio to elongate the sound. For example, the language-learning system may repeat each segment of sound between zero-amplitude crossings, as depicted in FIG. 5E. This would have the effect of maintaining the pitch while extending the duration of the sound. Filtering algorithms may be used to reduce high-frequency noise that could be generated by repeating sound fragments.

Figure 6:
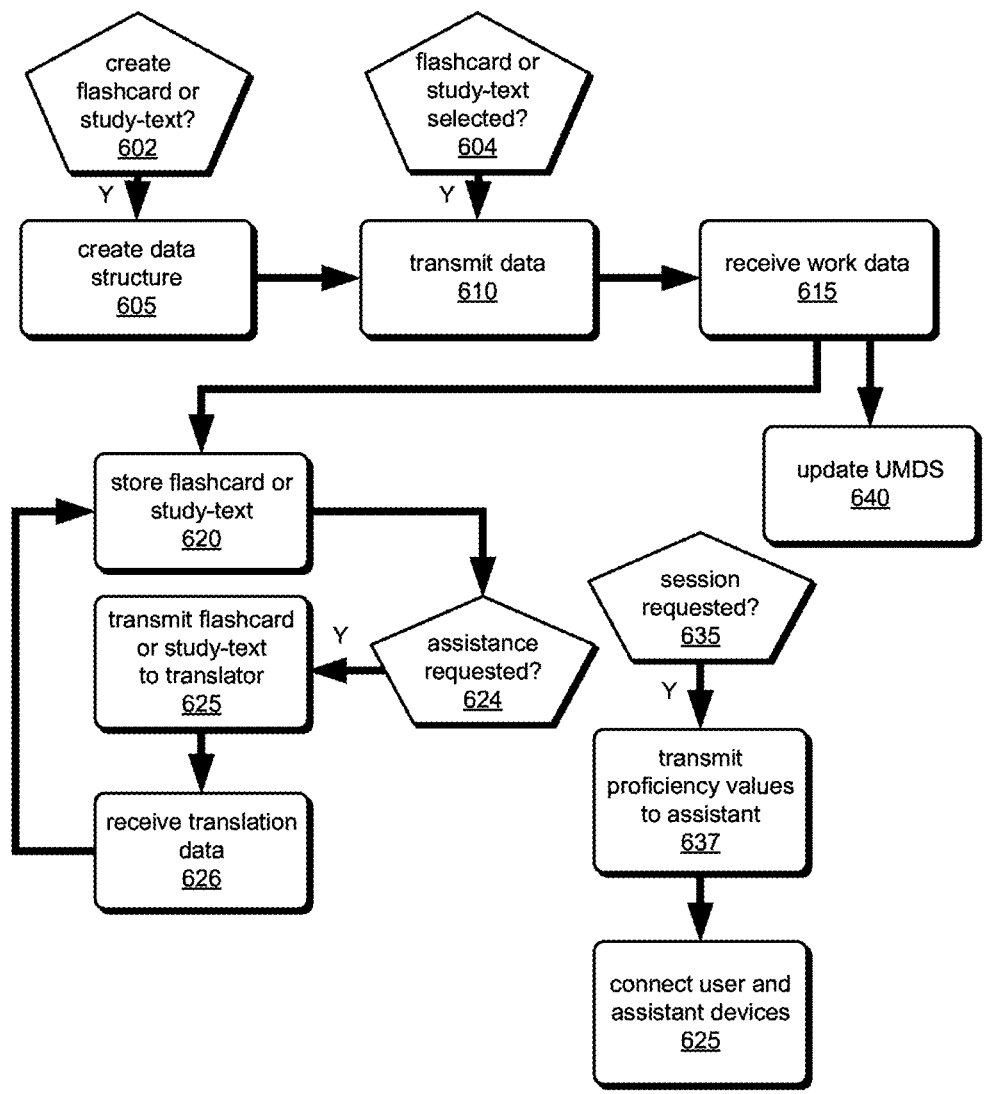
FIG. 6 illustrates acts associated with creating and using flashcard dashboards or text dashboards, according to some embodiments.

FIG. 6 depicts some acts that may be implemented during operation of an improved language-learning tool, according to some embodiments. The acts may be implemented when a user and/or assistant works with flashcard or study-text dashboards. According to some embodiments, the learning tool may display a "create flashcard" or "create text" active button and/or await user input to create 602 or identify 604 (e.g., select from a list of flashcards or study-text) a flashcard or text data structure that a user wishes to study. If input is received to create a study-text or flashcard data structure for a dashboard, for example, the tool may assemble 605 a data structure for a new study-text or flashcard dashboard. The data structure may include different types of data, display commands, and/or data fields for producing a dashboard and receiving input data as depicted in FIG. 4A through FIG. 5B. The learning tool may then transmit 610 the data for displaying a flashcard or text dashboard on a display of a user's device 130, 140. In some embodiments, the language-learning tool may receive 615 work data entered into the dashboard by the user. Work data may include new translatable text that a user wishes to learn and study, translations, audio recordings, translation requests, play-audio requests, button selections or commands, etc. According to some embodiments, a language-learning tool may receive 615 work data from a user as the user translates translatable items entered into or appearing on the dashboard.

Work data received from a user device 130 may include text and audio translations as well as requests for assistance, dictionary requests, and audio playback requests. When the language-learning system is executing locally on a device 130 that is off-line, work data may be acted upon locally (e.g., store translations, retrieve dictionary translations, play audio files from local copies, update the UMDS). Work data that may need external processing may be queued for transmission to an external device (e.g., a language-learning server) when the user device is connected on-line. When the language-learning system is executing on a device via an on-line browser, for example, work data may be packaged in one or more data transfer packets according to any suitable format and transmitted to a language-learning server. The language-learning server may then act on the received data and/or requests and may transmit corresponding data (e.g., updated study-text dashboard data, audio data, translation data, updated UMDS data, updated language store data) back to the user device 130 for display and/or storage at the user device.

When a user or user has finished working with a flashcard or text dashboard, a language-learning tool may receive a store command and store 620 the flashcard or study-text data for subsequent use. The language-learning tool may determine 624 if translation assistance has been requested for the flashcard or study text. If translation assistance has been requested, the tool may identify the flashcard or study-text for a translation-assistance queue, and may subsequently transmit 625 the associated data structure to an assistant or interpreter. An interpreter may work on the translatable text using an editor dashboard, and enter translation data using the dashboard. The improved language-learning tool may then receive 626 translation data from the interpreter, and may store 620 any received translation data in association with the data structure for the particular flashcard or study-text.

As mentioned above and described in further detail below, an improved language-learning system may include UMDSs for each user that uses the system. According to some embodiments, whenever a user works with a flashcard or text dashboard, the system may update 640 the user's UMDS, e.g., update memory representation data structures for the user that are associated with one or more words or phrases and translation aspects associated with the flashcard or text dashboard that the user works with. The time-dependent memory representations can provide a more detailed and highly accurate indication of the users proficiency in the second language than conventional scoring models used in existing language-learning tools.

At any time, a user may request 635 a tutorial session with an assistant or other person over a network 101. If a session has been requested, the improved language-learning system may transmit 637 or otherwise indicate proficiency values, computed from the user's UMDS, to the on-line assistant's device. According to some embodiments the language-learning system may connect 625 (e.g., facilitate communication between) the user and assistant devices. In some implementations, a sync manager 360 may coordinate display of study-text or flashcard data 201, 205 on both the user and assistant device displays, so that the user and assistant can simultaneously view a same flashcard or text dashboard for a study session. Study sessions may be requested by a user at any time, for example, when working on a newly-created text dashboard or a previously-created text dashboard. Requests for study sessions may be queued by the language-learning system and serviced based on next-available assistants that are on-line. Alternatively, a study session may be requested is an informal chat session, e.g., without focusing on flashcard or text dashboards. During a chat session, a user or assistant may create flashcards for the user.

VI. User-Memory Data Structures

An improved language-learning system constructs and maintains a user-memory data structure (UMDS) for each user. A UMDS is constructed by a computing device based on user interactions with the system and comprises data records, statistics, identifiers, and/or mathematical relationships that can identify what concepts and items, pertinent to a second language, the user has been exposed to and how well the user is retaining those concepts and items as a function of time. A UMDS can therefore identify a level of proficiency for the user in the second language with high quantitative granularity and accuracy. A UMDS may be updated every time the user flags a flashcard for study, studies the flashcard, provides an answer to a quiz (correctly or incorrectly), translates text having words that the user has previously studied, and identifies new words to be studied, for example. Based on an analysis of data exchanged during user interactions and times at which certain user interactions occur, the language-learning system can build memory representations for translatable items studied by the user, track what the user studies, and predict at which speed words, expressions, sentences, and texts may be forgotten, or how long they will be retained with a high probability of correct translation. Every user's UMDS may be different from other users' UMDS's and all UMDS's will change with time based on the users' interactions and/or passage of time.

According to some embodiments, even though a user may not work with the language-learning system for a period of time, e.g., a week or more, proficiency values for the user may change due to the passage of time and based upon memory representations determined from the user's previous interactions with the system. The language-learning system is configured to automatically track such changes and update a UMDS, so that the model will more accurately represent the user's comprehension level at any given time that the user interacts with the system. According to some embodiments, a user and/or the language-learning system can review information (e.g., proficiency values) calculated from a UMDS to determine what translatable text should be studied by the user and at which time it should be studied. Data from a UMDS may be provided or otherwise indicated to an assistant or other person by the language-learning system during on-line sessions, so that the assistant or other person can readily evaluate the proficiency level of the user with an unprecedented accuracy. For example, the assistant will know at a glance, for any translatable item appearing on a display before the user, which words and phrases the user is likely to know and the accuracy or confidence level with which the user knows those words and phrases. Further, the assistant will see which words and phrases the user does not know or has a high probability of not knowing.

Figures 7A, 7B:
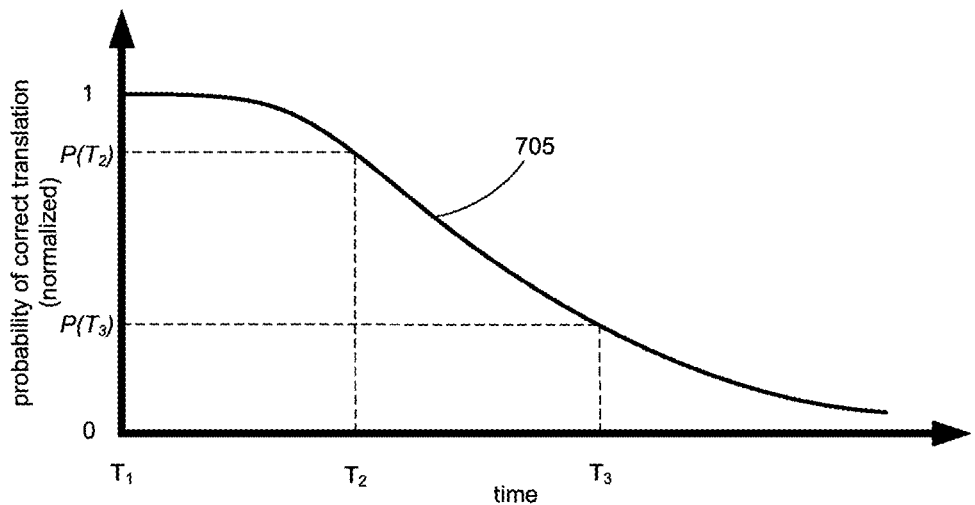
FIG. 7A depicts probability of a correct recognition or usage of a translation aspect as a function of time for a user that is calculated from a user's memory representation data, according to some embodiments.
FIG. 7B depicts a user-memory data structure, according to some embodiments.

A UMDS is based on past events (e.g., past performance of a user), but is also predictive. A UMDS may be accessed and updated during several operational aspects of an improved language-learning system (e.g., when studying flashcards, translating text, working with translatable items in an on-line session). In constructing a UMDS for a user, memory representation data structures may be constructed by the language-learning system for each word, phrase, and/or sentence that a user learns, and also for each translation aspect of the corresponding word, phrase, or sentence. The memory representation can be used to generate a user's memory characteristic for the translatable item and aspect. Just one example of a user's memory characteristic that may be calculated from memory representation data is depicted in the graph of FIG. 7A. The graph illustrates calculated probabilities (by a computing device which accesses a UMDS) that a user will provide a correct response for a translation aspect as a function of time.

According to some embodiments, a memory representation may be a sub-data structure within a UMDS that comprises data stored in memory that is representative of a relationship between a user's retention (or loss of retention) of a translation aspect of a translatable item and time. In some cases a memory representation may comprise data that is representative of a user's probability of providing a correct (or incorrect) translation as a function of time, where time may be expressed in any suitable unit (e.g., seconds, hours, days, weeks, months, or years). In some embodiments, a memory representation may comprise one or more parameters and one or more mathematical relationships that provide a functional form describing a confidence value for an accurate translation from a user as a function of time.

In some implementations, a memory representation may not include data representative of time, but still be time dependent. For example, a memory representation may comprise a running average of a user's score for a translation aspect. The running average may be updated whenever user input relevant to the translation aspect is received. In some cases, the language-learning system may weight all inputs equally to compute a running average.

In some embodiments, the language-learning system may weight different user inputs differently to compute a running average or other value for a memory representation. For example, more recent inputs (e.g., the last N inputs, where N may be between 0 and 20) may be weighted more heavily than prior inputs (e.g., inputs prior to the last N inputs). In some cases, different types of inputs (dictionary requests, typed text, words selected to match a translation) may be weighted differently when computing a memory representation.

In some embodiments, memory representations may be constructed by the language-learning system from data input by the user (e.g., correct and incorrect translations) and times at which the data is input. The construction and updating of the UMDS and it memory representations may occur whenever the user works with the language-learning system, e.g., while the user works with flashcard or text dashboards of the language-learning system.

As a simplified example and referring again to FIG. 7A, a user may learn a first word in a second language at a first time $T_1$, and at that time have a 100% confidence that the user will correctly translate the word in the second language to the user's native first language if quizzed. In some cases, the language-learning system may determine that a user has learned a translation aspect for a newly-presented word when the user correctly answers a subsequent quiz on the word for that aspect. The quiz or presentation for recognition may occur a designated time (e.g., one day) after the user first worked with a flashcard dashboard containing the new word. The language-learning system may then record a time $T_1$ (e.g., date and time) at which the translation aspect for the word has been learned, and assign an initial probability of 1 or 100% for a correct translation aspect at this time.

After passage of time, the user may begin to forget one or more translation aspects for a word, and some of the user's inputs may be incorrect whereas other inputs are correct. As a result, the chance that the user will provide a correct translation diminishes as a function of time, as depicted by the curve 705 in FIG. 7A. At a later time $T_2$, the probability that the user will provide a correct translation for the particular translation aspect may be determined by the language-learning system to be $P(T_2)$ based upon prior translation inputs (correct or incorrect recognition or usage events) provided by the user. If a curve such as that shown in FIG. 7A has been determined by the system for the user when constructing a memory representation for the user, the language-learning system may then be able to predict a time $T_3$ at which the user's performance $P(T_3)$ for that translation aspect (or an average for all aspects of a word or phrase) may fall to, or below, an unacceptably low level, which may be a threshold value that can be set by the user or an assistant.

According to some embodiments, the language-learning system may be programmed to automatically flag and/or provide flashcard or text dashboards to the user containing the word and translation aspect prior to the user reaching an unacceptably low level of performance. In some implementations, the language-learning system may be configured to automatically quiz the user on flagged flashcards at times that are automatically scheduled by the system, e.g., times when the confidence level of a correct translation is predicted to fall below a predetermined level.

In some embodiments, an assumed shape or functional form of a memory representation curve 705 for a translation aspect may be predetermined or pre-set (e.g., exponential, double-exponential, piece-wise linear, logarithmic, polynomial, or a combination thereof), and one or more decay rates (e.g., 1/e value, slope, half-life, polynomial coefficient) for the user may be determined by the language-learning system. In some implementations, the language-learning system may determine decay rate values (also referred to as "memory parameters") by functional fitting, e.g., least-squares fitting. Functional fits may be based upon correct and incorrect translations detected by the language-learning system over time when the user works with flashcard and text dashboards.

According to some embodiments, the shape of a memory-representation curve 705 and the decay rate value or values may be determined by the language-learning system. For example, different users may have different memory-representation curves that better represent the manner in which different individuals learn, retain, and forget words and phrases in a second language. Curve shapes and memory parameters may be based upon correct and incorrect translations detected by the language-learning system when the user works with flashcard and text dashboards.

According to some embodiments, a memory representation for a translation aspect may be recorded, at least in part, as an exponential function that is characterized by a half-life h1 value according to the following relationship, though memory representations are not limited to only this formulation.

$$P(t) = P_0 2^{\frac{-(t-t_1)}{h1}} \tag{1}$$

In this expression, $P_0$ represents an initial probability of a correct translation (e.g., 1 or 100%) at a time $t_1$ when a user first learns a word or phrase, t is time measured from $t_1$, and h1 is a half-life value.

According to some embodiments, a half-life value represents an amount of time after which the probability of providing a correct translation is divided by two. For instance, if the half-life of being able to correctly translate the word "Haus" from a second language to a first language is one week, then a user's memory representation according to EQ. 1 predicts that the user will correctly translate or recognize "Haus" with a probability of 50% after one week and a probability of 25% after two weeks.

It will be appreciated that there a many ways to construct memory representations and compute associated memory parameters. As just one example, and continuing with the half-life memory representation described above, half-life hl values may be computed by the language-learning system based on a number of successful tests. In this example, the memory parameter hl evolves with a user's correct and incorrect answers. According to the example, the half-life value may be set in the user's memory representation by the language-learning system using the following metrics: (1) after first successful translation, set hl=3 min; (2) after one incorrect translation, reduce hl to one-quarter its current value; (3) after two successful consecutive translations, set hl=30 min; (4) after three successful consecutive translations, set hl=3 hrs; (5) after four successful consecutive translations, set hl=1 day; (6) after five successful consecutive translations, set hl=3 days; (7) after six or more successful consecutive translations, increase hl to twice its current value. The numbers and fractions here are only exemplary, and other values may be used. In some embodiments, the language-learning system is configured to present a flashcard or text dashboard to a user containing a quiz for a translation aspect based upon the half-life value (e.g., presented at times that are equal to or proportional to the half-life values).

In some embodiments, quizzes for determining half-life values or UMDS parameters may be presented over a one or two-day period, or other predetermined period of time. For example, a user's ability to answer consecutive quizzes spaced apart over a two-day period may be indicative of the user's long-term, memory-representation curve 705. Therefore, long-term, memory-representation parameters may be determined from quizzes presented in a compressed time period. In some embodiments, the algorithm described above for setting hl values may be used to maintain the user's memory representations after initially determining the user's UMDS parameters in a compressed time period. For example, in two days a user may have provided five correct consecutive translations for a word to obtain a half-life of 3 days. On a fourth day after learning the word, the language-learning system may provide the word to the user in a same or different flashcard or text dashboard, and the user correctly translates the word. Then, the half-life value for that word and translation aspect would increase to 6 days. In this example, the half-life may double for each correct consecutive translation spaced apart by two or more days after the second day.

According to the examples of setting half-life above, the language-learning system may adapt to the user's learning curve in the following sense: if the computed half-life is too long, the half-life will quickly revert to a shorter half-life value, because the user will likely fail a quiz when presented to the user. If the half-life is too short however, the user will be able to correctly answer each successive quiz and increase the half-life value. This can be a beneficial feature of a half-life memory representation as described above; it can quickly correct when overestimating a user's capability. Further, the cost of retesting a well-known translation aspect is low, because the user may only spend a few seconds on each test, increase the half-life value relatively quickly, and increase the user's confidence. Also, the half-life memory representation and corresponding timed quizzes can avoid longer times associated with relearning a translation aspect for a word or phrase (nearly from scratch) when the word or phrase has not been studied or seen for a long period of time (e.g., a period significantly longer than the user's half-life value for that translation aspect). Accordingly, an improved language-learning system can tailor a user's study schedule to increase time between well-known translatable items to longer and longer time intervals. For example, when the half-life for a translation aspect of a translatable item reaches a couple of months, the system may quiz the user on that aspect a few times a year (e.g., one to six times per year). In this manner, the language-learning system can administer quizzes in an efficient manner, when needed, anticipating a natural forgetfulness of the user.

Another algorithm that may be used by a language-learning system for computing half-life values may be based on time intervals between consecutive successful tests. For example, an algorithm may be as follows: (1) following a first correct translation, set hl=15 min; (2) following an incorrect translation, reduce hl to one-quarter its current value; (3) after two consecutive correct translations, set hl to the greater value of $1.5 \times (t_{n+1} - t_n)$ or the previous half-live value where $(t_{n+1} - t_n)$ represents the time between the two consecutive tests. In this method, the value of 1.5 is used for explanation, and other values may be used in other embodiments. This method of computing half-life values may track the user's natural memory characteristics, since the half-life value is proportional to a time span over which the user has correctly answered two consecutive quizzes.

In some implementations, statistical and/or averaging methods across different words and phrases may be used to determine UMDS parameters. For example, a user's responses s(u) may be recorded by the language-learning system as follows.

$$s(u) = \{(f_1, \alpha_1, \delta_1, s_1)_i, (f_2, \alpha_2, \delta_2, s_2)_{i+1}, \ldots (f_n, \alpha_n, \delta_n, s_n)_{i+n},\} \quad (2)$$

In this expression, $f_n$ represents an identifier for a translatable item (word, phrase, or sentence, for example) associated with a flashcard, $\alpha_n$ represents a translation aspect for the word, phrase, or sentence, $\delta_n$ represents a time interval between consecutive tests for the word, phrase, or sentence, and $s_n$ may be a Boolean value representing a correct or incorrect translation for the $i^{th}$ test. From this data set, all data corresponding to a particular translation aspect may be grouped together and analyzed for the user. The resulting data set may be represented by the following expression.

$$s(u, \alpha_2) = \{(f_2, \delta_2, s_2)_{i+1}, \ldots (f_n, \delta_n, s_n)_{i+n},\}_{\alpha_n = \alpha_2} \quad (3)$$

The resulting data may be analyzed by the language-learning system using any suitable method to determine a half-life value for the translation aspect. For example, the data may be analyzed to determine a time interval value $\delta_n$ after which the number of incorrect translations exceeds the number of correct translations. This value may then be taken as a half-life value for the user for that translation aspect and recorded in a memory representation of the UMDS.

In some implementations, the language-learning system may not average across different translatable items, and may analyze data associated with a particular word, for example.

$$s(u, f_2, \alpha_2) = \{(\beta_2, s_2)_{i+1}, \ldots (\delta_n, s_n)_{i+n},\}_{\alpha_n = \alpha_2, f_n = f_2} \quad (4)$$

The collected data may be analyzed for the particular word and translation aspect as described above, e.g., determining a time interval value $\delta_n$ after which the number of incorrect translations exceeds the number of correct translations. Other statistical methods may be used for determining a half-life value or UMDS parameter, as described below.

Other statistical methods of computing and maintaining memory representations may be used additionally or alternatively to the methods described above. In some embodiments, a memory representation may be refined over time, and may be based upon a history of a user's responses to flashcard quizzes and/or work on translatable text. For example, the language-learning system may maintain a data record of correct and incorrect translations for each translation aspect which a user has studied. This record may contain all user responses s(u) described above. In some embodiments, the results may be analyzed for a particular translation aspect and/or translatable item, e.g., binned into different time intervals between consecutive tests and processed to generate a histogram showing a percentage of correct responses recorded for each bin. This histogram may then indicate a probability of a correct response as a function of time intervals between consecutive tests. As more data is collected on a user, a language-learning system may switch from an initial memory representation, such as a half-life model using any of the algorithms described above, to a statistical model that is based on accumulated data for the user over the user's lifetime of use of the system, such as the histogram model. The statistical model may be continuously updated with new data. For a histogram model, a user's probability of providing a correct translation may be a current value computed for the histogram for a time interval since the user was last tested on the translatable item and translation aspect.

In some embodiments, a time $T_1$ at which a user first learns a translation aspect of a new word in a second language may be determined in the following manner. For example, the language-learning system may present a new word to a user at a time $T_0$ and subsequently test the user on that word for a translation aspect at one or more subsequent times. According to some embodiments, an improved language-learning system may record the time $T_1$ as a time at which the user first provides a correct translation of the translation aspect for a test administered after $T_0$. Other methods may be used to determine the time $T_1$. In some embodiments, an improved language-learning system may record the time $T_1$ as a time at which the user first provides a second, consecutive correct translation of the translation aspect for a test administered after $T_0$. According to some implementations, a second test may be spaced from a first test by a predetermined amount of time, e.g., a time between about one hour and two days.

Once determined, a time $T_1$ may be recorded in a UMDS data structure for the user and associated with a corresponding translatable item and translation aspect. According to some embodiments, an improved language-learning system may not change the value of $T_1$ after it has been recorded. However, some implementations of an improved language-learning system may alter the value of $T_1$ if the system determines that the user has substantially forgotten the translatable item. For example, if the user fails a number of consecutive tests of a translation aspect and/or fails tests for all translation aspects of a translatable item. In some implementations, an improved language-learning system may set a threshold representing a level of proficiency below which $T_1$ is reset. When $T_1$ is reset, T1 may be advanced to a next time at which the user provides a correct response for translation aspect for a translatable item responsive to a quiz.

When $T_1$ for a translation aspect of a word, for example, has been determined for a user, the language-learning system may accumulate additional data for the word, for the translation aspect, and for that user. Each additional piece of data may be used to update a memory representation and/or UMDS parameter for that translation aspect. Additional data may be accumulated for other translation aspects associated with the word. According to some embodiments, the language-learning system may record each subsequent test time and test result for each translation aspect of the word. All data relating to a UMDS may be stored in any suitable format in a data structure that is managed by an improved language-learning system.

FIG. 7B depicts just one example of a UMDS data structure 702 that may be maintained by an improved language-learning system to represent memory characteristics for a user. According to some embodiments, a UMDS data structure may comprise a data structure stored on a data storage device, and include a user identification value 710 that associates a particular user with the UMDS data recorded for that user. The data structure may include a listing of translatable items or translatable item identifiers 720-1, 720-2, 720-*n*. Each item 720 may correspond to a word, phrase, sentence, etc. in the second language. For example, a translatable item may be a text representation in some embodiments. In some embodiments, a translatable item may be a pointer or other linking identifier that identifies an entry in a dictionary or language data store 310.

Associated with each item 720 may be one or more translation aspects 721. For example a first translation aspect 721-11 may comprise writing a correct translation of the word or phrase in the user's first language after seeing the word or phrase in the second language. A second translation aspect 721-12 may comprise hearing the word in the second language and writing or typing the word into the users first language. For each translation aspect, the system may record a time $T_1$ 722-*nn* at which it has been determined that the user first knows the correct translation, as described above. A UMDS data structure 702 may, or may not, further include a record of test times 723-*nn* and test results 724-*nn* identifying when the user has been tested for a particular translation aspect and a corresponding test result. A UMDS data structure may also include a memory-representation data field 725-*nn* storing data that characterizes a memory-representation curve 705. The memory-representation data 725 may include parameters (e.g., values parameterizing a memory-representation curve), data identifying a memory representation type and/or functional form, and may include proficiency values. There may be one or more memory-representation values stored in association with each translation aspect.

A UMDS data structure 702 may be constantly updated as a user uses the language-learning system, so that memory representations for the user are dynamically updated. Data for the UMDS data structure may be collected by an improved language-learning system at various times when a user works with translatable text and need not be limited to flashcard quizzes. For example, a user may copy text into a newly-created flashcard or text dashboard, and may begin translating the copied text. The language-learning system may identify which words and phrases in the copied text have been previously studied by the user and which words and phrases are new to the user. In some embodiments, the language-learning system may automatically generate and flag new flashcards for new words and phrases of the copied text. For words and phrases that have been previously studied by the user, the language-learning system may detect whether the user enters a correct or incorrect translation while translating the text. Detected correct and incorrect translations may be recorded in the UMDS data structure and/or used to update memory-representation parameters. According to some embodiments, the user's interactions with an improved language-learning system "trains" the UMDS.

In some embodiments, at least some values stored for T1 722-*nn*, test times 723-*nn*, and test results 724-*nn* may, or may not, be overwritten as new results are recorded in the UMDS data structure. In some implementations, all data is added to a user's record without overwriting or erasure of earlier-recorded data. Additionally, memory-representation data 725-*nn* may be continuously updated as new data are accumulated.

When a user requests and on-line session with an assistant or a study-mate, the language-learning system may compile and/or process data from the UMDS data structure 702 and transmit a report to the assistant or study-mate, so that the assistant or study-mate can rapidly evaluate the proficiency of the user for various words, phrases, sentences and translation aspects. In this manner an assistant or on-line assistant can quickly gauge the level of proficiency of the user, and readily tailor the on-line session to the user. For example, an assistant, after selecting translatable text for a user to review during an on-line session, may immediately see how much of the text the user knows and does not know and/or receive a score indicating a level of difficulty of the text for the user. In some embodiments, the language-learning system may transmit computed probabilities, based upon the user's memory representations, for a correct translation for each word in the text. In some implementations, the language-learning system may transmit a score that is an average of the computed probabilities of correct answers for each word.

Figure 8:
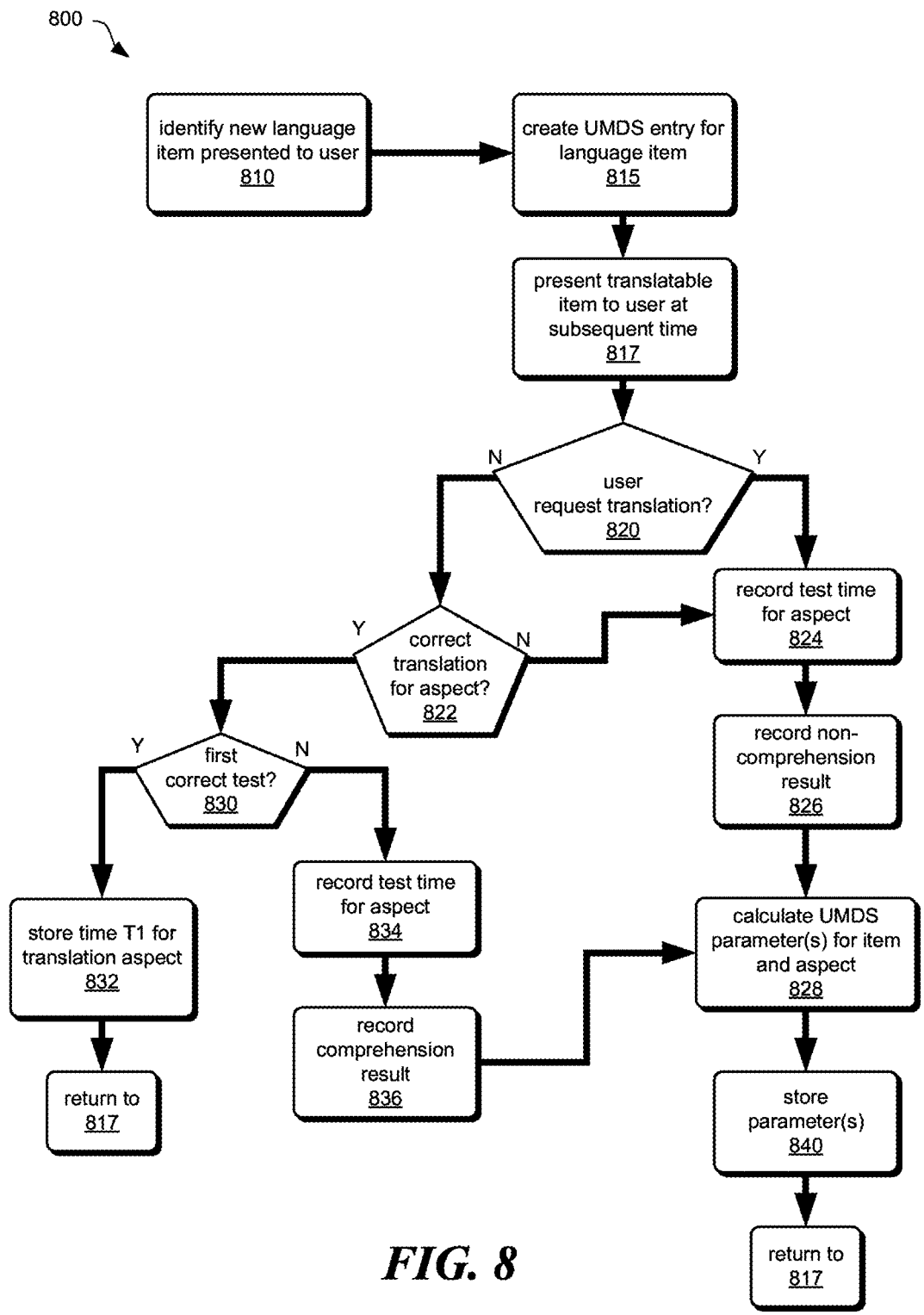
FIG. 8 illustrates acts associated with maintaining a memory representation data structure for a user, according to some embodiments.

FIG. 8 depicts just one embodiment of a method 800 that may be used to create and manage memory representations for a user in an improved language-learning system. Such a method may be used to update a UMDS. Alternative embodiments may include more or fewer acts, and may be arranged in a different order. According to some embodiments, the system may identify 810 a translatable item and translation aspect that is newly presented to the user. The new translatable item may be a word or a phrase, for example, in a second language. Responsive to identifying a new translatable item, the system may create 815 a UMDS entry for the new translatable item (e.g., generate data fields associated with a memory representation). The UMDS entry may include data fields (e.g., T1 fields, test time fields, test result fields, memory-representation fields, etc.) for each translation aspect of the new translatable item, as depicted in FIG. 7B.

After the initial presentation of the new translatable item to the user, the language-learning system may present 817 the item to the user at a subsequent time. The subsequent presentation may be in the form of a flashcard quiz, or may be translatable text or audio where the translatable item is included in a plurality of words of the text or audio. Upon seeing or hearing the translatable item, the user may or may not request 820 a translation for the item. In some embodiments, a request may comprise revealing a hidden translation on a flashcard dashboard. In some implementations, a request may comprise consulting a dictionary translation of the item.

If the user does not request a translation for the translatable item, the system may determine 822 whether the user provides a correct translation. If the user provides a correct translation, the language-learning system may determine 830 whether the provided translation is a first correct translation by the user for that translation aspect. If it is determined 830 that the correct translation corresponds to a first successful test, the system may store 832 a time $T_1$ that identifies a time at which the user has first learned the translation aspect for the translatable item. The system may then return to a step of presenting 817 the translatable item to the user at different times.

If the language-learning system determines 830 that the result of the test is not a first test of the translatable item for the user, and and determines that the user has provided a correct translation for a translation aspect of the translatable item, then the system may record 834 the test time and further record 836 a positive comprehension result for the translation aspect and item for the user. The system may then calculate 828 one or more UMDS parameters for the translatable item and translation aspect based upon the correct response. The system may then store 840 the one or more parameters in the user's UMDS data record 702 in a personal comprehension data store 350-1. The system may then return to a step of presenting 817 a translatable item to the user.

In some embodiments, if the language-learning system determines 822 that a user provides an incorrect translation for a translatable item, the system may record 824 a test time for the incorrect response and translation aspect, and further record a non-comprehension result 826 for the translation aspect. The language-learning system may then calculate 828 one or more UMDS parameters for the translatable item and translation aspect based upon the incorrect response, and store 840 the updated parameters in the user's personal comprehension data store. The system may then return to a step of presenting 817 translatable items to the user.

There may be several methods by which an improved language-learning system detects correct and incorrect translations for translation aspects of translatable items. In some embodiments, the system may determine 822 a correct or incorrect translation based upon text that is entered by the user in response to a flashcard quiz. In some embodiments, a correct or incorrect translation may be detected based upon speech input by the user in response to a flashcard quiz. For example a language-learning system may use speech-recognition technology or audio data comparison to detect correct or incorrect verbal utterances from a user.

In some implementations, correct and incorrect responses may be detected when a user works on translating text presented in a newly-created flashcard or text dashboard. For example, a text dashboard containing translatable text may be presented to the user. In some embodiments, a user may select or highlight one or more words in the translatable text that the user does not know. For example, the words may be highlighted for translation assistance. The language-learning system may detect the words highlighted by the user and determine whether one or more of the highlighted words were previously studied by the user. If a highlighted word has been studied by the user, the system may determine that the act of highlighting the word by the user is a recognition error. The system may then record a time and non-comprehension result in the user's UMDS data record and/or update the UMDS parameters. Additionally, words that have not been highlighted by the user and that have previously studied by the user may be detected by the language-learning system as correct recognition by the user. Accordingly, positive comprehension results and test times for these words may be stored in the user's UMDS data record and/or the UMDS parameters may be updated. In some embodiments, a user may activate a dictionary button 460 to interpret one or more words appearing in a flashcard or text dashboard. The language-learning system may detect the activation of the dictionary button 460 and determine whether the word has been previously studied by the user. If the word has previously been studied by the user, the system may interpret the activation of the dictionary as a recognition error, and update the user's UMDS data record accordingly. By one or more of these methods, an improved language-learning system may accumulate statistics and/or update memory representations and memory parameters of words and phrases and corresponding translation aspects that a user knows and does not know as the user interacts with the system.

Figure 9:
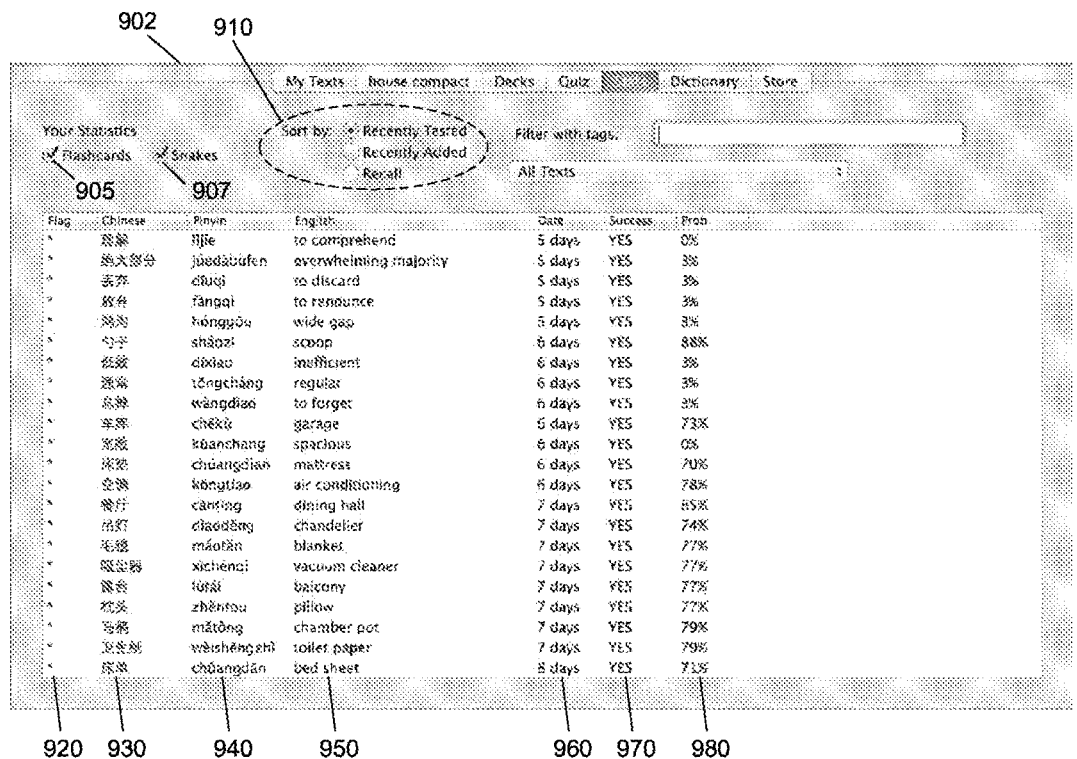
FIG. 9 depicts a flashcard summary dashboard, according to some embodiments.

Because an improved language-learning system develops detailed UMDS records for a user, the language-learning system can provide a helpful amount of statistics and/or statistical summaries for the benefit of a user and/or assistant. FIG. 9 is one example of a flashcard summary dashboard 902 that may be provided to a user and/or assistant or other on-line assistant. A flashcard summary dashboard 902 may include display data and a compilation of statistical data and/or computations of user proficiency values developed from the user's UMDS data record that is transmitted to a user's and/or assistant's device 130, 140 for display. According to some embodiments, a flashcard summary dashboard may include a list of words 930 in the second language (Chinese in the illustrated example) that are included in flashcards studied by the user and that may or may not have been flagged by the user as being important to the user. According to some embodiments, when a flashcard is studied by a user, a flag value may be set by the system to a first value in the flashcard's data structure to indicate that the flashcard is important to the user. A flashcard summary may identify flagged flashcards in a list of flag values 920. For example, an asterisk, value of 1, or other character may identify important flashcards. A statistical summary 902 may also include pronunciations 940 and translations 950 for flashcard words.

The statistical data included with a flashcard summary may comprise a list of times 960 when each translatable item on the list was last viewed or studied by the user. In some implementations, the statistical summary may also include a compiled or aggregate score 980 for each translatable item. In some embodiments, a breakdown of scores for each translation aspect may be included. An aggregate score may be based upon a compilation of different translation aspect scores for each translatable item. For example an aggregate score 980 may comprise an average value of probabilities of correct translations for each translation aspect of a translatable item.

A flashcard summary dashboard 902 may also include active buttons for selecting how the information shall be displayed. For example, a flashcard summary 902 may include a "flashcard" button 905 that selects for display in the summary only words from flashcards that contain a single translatable word. A second's "snakes" button 907 may be included to display words that appear in, or identifiers for, phrases, sentences, or paragraphs, or passages of flashcards containing multiple words of translatable text. A flashcard summary dashboard may also include active buttons for displaying an order in which the results are listed in the summary. For example, a set of sorting buttons 910 may be included to sort the listings by words that were recently tested or recently added to the user's personal language data store 320-1. In some embodiments, the listings may be sorted by how well, or how poorly, the user recalls translations for the listed item. This sorting may be based on computed current probabilities that the user will provide correct translations for the translatable items.

The language-learning system may also provide study-text summary dashboards for study-text. A study-text summary dashboard may be similar to the flashcard summary dashboard 902, but contain data relevant to the study-text. In some implementations, a flashcard summary dashboard may also include data summaries for study-text.

As discussed above, flashcards and study-text may be arranged into decks by a user, and stored accordingly by the language-learning system. In various embodiments, a user may group a number of flashcards and study-text together into a deck that the user wishes to identify by subject matter. For example, a user may wish to group together such words as "door," "window," "stairs," "wall," "fireplace," "chimney," "sink," "bathroom," etc. into a deck title "house." According to some embodiments, a user may create a deck, e.g., by activating a "new" or "new deck" button 422 on a flashcard and entering a title for the deck. A user may then associate a plurality of flashcards and study-texts with the deck by drag-and-drop or click operations or by identifying a flashcard or study-text title in association with the deck title. The language-learning system may store one or more identifiers (e.g., store identifiers in a user's personal language data record 702) for each translatable item that links a translatable item and its associated flashcard and/or study-text with one or more decks.

Figure 10:
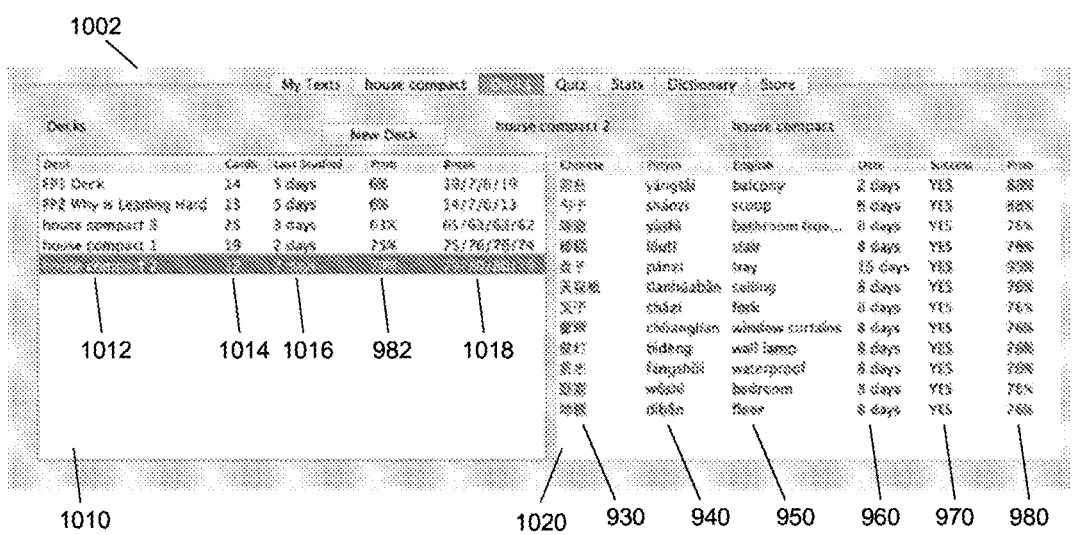
FIG. 10 depicts a deck summary dashboard, according to some embodiments.

In some embodiments, a language-learning system may include statistical summary data for decks of flashcards and/or study texts, as depicted in FIG. 10. A deck summary dashboard 1002 may include a first window 1010 that displays a listing of decks 1012 studied by a user, and a second window 1020 that includes information and statistical data about translatable items for each flashcard or study-text. According to some embodiments the first window 1010 may include a list of the number of flashcards and study-texts 1014 that are included in each deck, and a time 1016 at which the deck was last studied. In some embodiments, a list of aggregate scores 982 representative of the user's proficiency for the deck may be included in the deck summary 1002. In some embodiments, an aggregate score for a deck may comprise an average score of the user's probabilities of correct translations for all translation aspects and all translatable items within the deck.

In some implementations, a statistical summary (in either a flashcard summary, study-text summary, or deck summary) may include a breakdown of a user's different probabilities of correct translations for each translation aspect. In some cases, the breakdown of a user's probabilities may be averaged within each translation aspect over all translatable items in a deck and included in a deck statistical summary 1002, as depicted in FIG. 10. A breakdown of a user's probabilities for different translation aspects can provide a more details view of a user's comprehension of words, phrases, sentences, or translatable items associated with a flashcard, study-text, or deck.

For example and referring to FIG. 10, a deck titled "house compact 2" has a probabilities breakdown score of 79/80/80/79. This score may be used to represent that a user, at the current time, has a 79% chance of correctly translating a typed word in the deck from the second language into the user's first language, an 80% chance of correctly writing a word from the first language in the deck into a second language, an 80% chance that the user will correctly transcribe a word in the deck heard in the second language into the first language, and a 79% chance that the user will correctly verbally translate a word in the deck from the first language to the second language.

In various embodiments, a flashcard summary dashboard 902 and/or deck summary dashboard 1002 (or data therefrom) may be shared with an assistant or other person during an on-line session. It may be appreciated that an assistant may view the statistical data quickly to identify words and study text or decks that the user knows well and does not know, so that the on-line session may be more focused to aid the user in areas where the user can improve their comprehension. Accordingly, even brief on-line sessions can be tailored quickly and become more efficient uses of time for the user.

VII. Statistical Compilations

As described above, an improved language-learning system can store an appreciable amount of detailed information in a UMDS, and can provide an appreciable amount of statistical data from which to evaluate a user's proficiency in a second language. For example, a language-learning may record the history of learning of any translatable item and associated translation aspects for a user. The system may store additional user-related information. For example, it may record information about when flashcards, decks, and study-texts are studied, progress made on translating text (e.g., percent completion), and practicing deck quizzes. Data that may be included in a user's data record may include: identifiers (titles) for text, flashcards, and/or decks studied, time last studied, bookmarks indicating where the user stopped working, identifiers (flag values) indicating whether a translatable item or items in a flashcard, study-text, or deck has been marked by the user as being important to the user, record of access to a dictionary, personal notes entered by a user for a translatable item, one or more tags identifying a subject matter.

Because the level of detail of information that may be presented to a user could be overwhelming or distracting on a visual display to a user, statistical data may be compiled according to some embodiments, though also available in detail upon request. One method for compiling statistical data is according to the following expression.

$$P(u, f_i) = \frac{1}{N} \sum_{n=1}^{N} P(u, f_i, a_n) \tag{5}$$

In EQ. 5, $P(u, f_i)$ represents a combined probability for a user of correctly translating any translation aspect $a_n$ for a particular translatable item $f_i$. In some embodiments, a combined probability may be weighted according to the following relation.

$$P(u, f_i) = \frac{1}{N} \sum_{n=1}^{N} P(u, f_i, a_n) \tag{6}$$

where $\alpha_n$ represents a weighting value for a translation aspect $a_n$ and $\Sigma\alpha_n=1$. The weighting values $\alpha_n$ may be preset by a system developer, in some embodiments. As one non-limiting example, the following weighting values may be set in an improved language-learning system: $\alpha_{rc}=0.25$ for correct visual recognition and translation of a translatable item presented to the user in the second language, $\alpha_{pc}=0.20$ for correctly writing the item in the second language when seeing or hearing it in the first language, $\alpha_{rs}=0.25$ for correct audio recognition of the item presented in the second language, $\alpha_{ps}=0.25$ for correctly speaking the item in the second language when seeing or hearing it in the first language, and $\alpha_{kp}=0.05$ for correctly providing a phonetic transcription of the item presented in the second language. Other weighting values may be used in other embodiments. For example, weighting values for a user who is deaf may be $\alpha_{rc}=0.35$, $\alpha_{pc}=0.35$, $\alpha_{rs}=0$, $\alpha_{ps}=0.2$, $\alpha_{kp}=0.1$.

VIII. First Language Improvement and Specific Vocabulary Development

Although the improved language-learning system is described above for studying a second language, the system may also be used to improve an individual's vocabulary and language capabilities in a user's first language. For example, a user may desire to increase his or her vocabulary in his or her first language. The user may create flashcards or study-texts with words previously unknown to the user for subsequent study. A flashcard may include a single word, a sentence, a phrase, etc. and its translation. A first-language UMDS data record may be maintained by the improved language-learning system for the individual according to the methods described above. Additionally, the language-learning system may quiz the individual on newly learned vocabulary items according to the methods described above.

In some embodiments, an individual may copy examples of text or sentences into a flashcard or study-text for study. This may be done to improve an individual's speaking style. Also, an individual may connect, through the language-learning system, to on-line language coaches that may be recognized masters at speaking in the first language.

It may be appreciated that the improved language-learning system may also be useful for developing specific vocabularies by individuals. For example, a medical user may use the language-learning system to develop a vocabulary specific to an area of medical practice.

When used for a user's first language, each item of vocabulary may have only one two translation aspects: (1) providing a correct definition when seeing or hearing the item, and (2) providing the item when seeing or hearing the corresponding definition. Accordingly, a UMDS data structure for first-language usage may be simplified compared to the structure depicted in FIG. 7B. Additionally, statistical data collection, presentation, and computations may be simplified.

IX. Configurations

As may be appreciated, there may be many different configurations and embodiments of an improved language-learning system that constructs user-memory data structures for users. Some configurations and embodiments are given below, but the invention is not limited to the listed configurations and embodiments.

(1) A device comprising an electronic display, a processor in communication with the electronic display, and a data storage device in communication with the processor, wherein the data storage device includes machine-readable instructions that adapt the device to: retrieve text data from a data file; render, in a user interface on the electronic display at a plurality of different times, text in a foreign language from the text data, wherein the displayed text includes a translatable item; receive translation responses for the translatable item from a user via the user interface at the plurality of different times; construct a memory representation for the translatable item based on the translation responses; store the memory representation in a user-memory data structure for the user, wherein the memory representation comprises data representative of a time-dependent accuracy of the user's translation response for the translatable item and wherein the user-memory data structure comprises a plurality of memory representations; and determine, by the processor, an appearance of text to be displayed for the translatable item based on an accuracy determined for the translatable item from the memory representation and from an approximate time at which the text for the translatable item is to be displayed.

(2) The device of configuration (1), further comprising machine-readable instructions stored on the data storage device that adapt the processor to determine, from the memory representation, a time at which the translatable item is to be displayed in a user interface on the electronic display for the user.

(3) The device of (1) or (2), further comprising machine-readable instructions stored on the data storage device that adapt the processor to: determine, from the user-memory data structure for the user and from a time, a level of difficulty for new text; and not display the new text to the user if the level of difficulty exceeds a preset value.

(4) The device of (3), wherein the new text is retrieved automatically from an on-line source.

(5) The device of any one of (1)-(4), further comprising machine-readable instructions stored on the data storage device that adapt the processor to: determine, from the user-memory data structure for the user and from a time, a level of difficulty for new text; display words of the new text in a first color for which a probability of a correct translation by the user is above a first value; and display words of the new text in a second color for which a probability of a correct translation by the user is below a second value.

(6) The device of any one of (1)-(5), further comprising machine-readable instructions stored on the data storage device that adapt the processor to: determine, from the user-memory data structure for the user, that a retention value for a translatable item for the user exceeds a predetermined value; and remove data from digital memory that was stored in the digital memory in association with the translatable item if the retention value exceeds the predetermined value.

(7) The device of any of (1)-(6), further comprising machine-readable instructions stored on the data storage device that adapt the processor to determine, from the user-memory data structure for the user and from a time, which memory representation data is to be exchanged in an update communication with an external device.

(8) The device of any one of (1)-(7), wherein the memory representation includes data that characterizes a rate of decrease as a function of time in the user's accuracy for providing a correct translation response for the translatable item.

(9) The device of any one of (1)-(8), wherein the memory representation includes a half-life value for the translatable item.

(10) The device of any one of (1)-(9), further comprising an audio speaker and machine-readable instructions that adapt the device to: identify first audio data that has been aligned to the translatable item within the text; activate the audio speaker to produce a first audio rendering in the foreign language of the translatable item from the first audio data; identify second audio data that has been aligned to the translatable item within the text; and activate the audio speaker to produce a second audio rendering in the foreign language of the translatable item from the second audio data, wherein the second audio rendering exhibits a different pronunciation from the first audio rendering.

(11) The device of (10), wherein the first audio data and second audio data correspond to different dialects.

(12) The device of (10), wherein the first audio data corresponds to a male speaker and the second audio data corresponds to a female speaker.

(13) The device of (10), wherein the second audio data corresponds to a same translation as the first audio data but comprises a slower rate of speech than the first audio data.

(14) The device of any one of (10)-(13), further comprising machine-readable instructions that adapt the device to: receive information identifying a geographic region of a state or country; identify the first audio data based on the identified geographic region; and activate the audio speaker to produce the first audio rendering from the first audio data having a dialect that is representative of the identified geographic region.

(15) The device of (14), wherein the information identifying a geographic region is received from a global positioning system.

(16) The device of any one of (10)-(15), further comprising machine-readable instructions that adapt the device to: display an audio alignment user interface; display the text in the audio alignment user interface; display an audio trace corresponding to an audio file associated with the text; activate the audio speaker of the device to produce an audio rendering from the audio file; receive a first alignment input identifying a first location in the displayed text that corresponds to a beginning of the translatable item while the audio rendering is being produced; store a first identifier that identifies a start location in the audio file for the translatable item; receive a second alignment input identifying a second location in the displayed text that corresponds to an end of the translatable item while the audio rendering is being produced; and store a second identifier that identifies a stop location in the audio file for the translatable item.

(17) The device of (16), further comprising machine-readable instructions that adapt the device to display first and second markers on the audio trace indicating the first and second locations in the audio file.

(18) The device of (17), further comprising machine-readable instructions that adapt the device to change the first identifier to identify a third location in the audio file that is different from the start location responsive to a user dragging the first marker.

(19) A server comprising at least one processor and a data storage device in communication with the processor, wherein the data storage device includes machine-readable instructions that adapt the server to: retrieve text data from a data file; prepare user-interface data for rendering, in a user interface on a remote electronic display of an external device at a plurality of different times, text in a foreign language from the text data, wherein the displayed text includes a translatable item; receive translation responses for the translatable item from a user via the user interface at the plurality of different times; construct a memory representation for the translatable item based on the translation responses; store the memory representation in a user-memory data structure for the user, wherein the memory representation comprises data representative of a time-dependent accuracy of the user's translation response for the translatable item and wherein the user-memory data structure comprises a plurality of memory representations; and determine, by the processor, an appearance of text to be displayed for the translatable item based on an accuracy determined for the translatable item from the memory representation and from an approximate time at which the text for the translatable item is to be displayed.

(20) The server of configuration (19), further comprising machine-readable instructions stored on the data storage device that adapt the server to determine, from the memory representation, a time at which the translatable item is to be rendered in a user interface on the remote electronic display for the user.

(21) The server of (19) or (20), further comprising machine-readable instructions stored on the data storage device that adapt the server to: determine, from the user-memory data structure for the user and from a time, a level of difficulty for new text; and not provide the new text for rendering on the remote electronic display if the level of difficulty exceeds a preset value.

(22) The server of any one of (19)-(21), further comprising machine-readable instructions stored on the data storage device that adapt the server to: determine, from the user-memory data structure for the user and from a time, a level of difficulty for new text; generate user interface data to display words of the new text on the remote electronic display in a first color for which a probability of a correct translation by the user is above a first value; and generate user interface data to display words of the new text on the remote electronic display in a second color for which a probability of a correct translation by the user is below a second value.

(23) The server of any one of (19)-(22), further comprising machine-readable instructions stored on the data storage device that adapt the server to: determine, from the user-memory data structure for the user, that a retention value for a translatable item for the user exceeds a predetermined value; and remove data from digital memory that was stored in the digital memory in association with the translatable item if the retention value exceeds the predetermined value.

(24) The server of any one of (19)-(23), further comprising machine-readable instructions stored on the data storage device that adapt the server to determine, from the user-memory data structure for the user and from a time, which memory representation data is to be exchanged in an update communication with the external device.

(25) The server of any one of (19)-(24), wherein the memory representation includes data that characterizes a rate of decrease as a function of time in the user's accuracy for providing a correct translation response for the translatable item.

X. Terms and Phrases

As an aid to understanding the various embodiments, some definitions are provided for frequently used terms. These definitions are intended to serve as a guide for a term's meaning.

As used herein, the term "user" refers to a person operating a computing device to gain proficiency in a subject matter, e.g., learning a second language.

The term "assistant," may refer to a person other than the user that assists the user on-line in gaining proficiency in the subject matter.

The phrase "first language" refers to a native language of the user. The phrase "second language" refers to a foreign language being studied by the user.

The phrases "translatable text" or "translation text" refer to text in the first or second language rendered or stored as digital data on a storage device. Such text may comprise a word, a phrase, a sentence, a paragraph, or multiple paragraphs.

The phrases "translatable item" or "translation item" refer to translatable text or to audible utterances in the first or second language rendered or stored as digital data on a storage device.

The phrase "translation aspect" may refer to (1) an aspect of seeing text in the first language and transcribing to the second language, (2) an aspect of seeing text in the second language and transcribing to the first language, (3) an aspect of seeing text in or hearing the first language and orally translating to the second language, (4) an aspect of hearing the second language and orally translating or transcribing to the first language, and (5) an aspect of seeing text in or hearing the second language and writing a phonetic translation in the first language.

The phrase "user-memory data structure" refers collectively to memory representations and associated data maintained as a dynamic digital record by a computing device for a user. A user-memory data structure can provide a highly granular, time-dependent, quantitative measure of a user's proficiency in a language studied by the user. For example, a user-memory data structure can indicate a user's proficiency on a word-by-word and translation-aspect-by-translation-aspect basis. A computing device may maintain individualized user-memory data structures for each user of the system.

The phrase "memory representation" refers to a sub data structure within a UMDS and may comprise one or more identifiers for one or more translation aspects of a translatable item, temporal data, user-response data (e.g., indicators for correct or incorrect recognition or usage events), memory parameters, a mathematical relationship, and/or statistical data that can be used by a computing device to estimate the likelihood of a correct, or incorrect, translation response by the user as a function of time. A memory representation can be representative of a user's time-dependent memory characteristics for a translation aspect and/or translatable item. Multiple memory representations (e.g., one for each word and translation aspect) may be maintained by a computing device for a user. In some implementations, more than one type of memory representation may be used for a user.

The phrase "memory parameter" refers to a parameter that is used, at least in part, to define a memory representation. For example, a memory parameter may be a half-life value or 1/e value for a memory representation that comprises an exponential decay. In some implementations, more than one memory parameter may be used to define a memory representation.

The phrase "proficiency value" refers to a value computed from a memory representation for a translation aspect of a translatable item. The proficiency value may represent the likelihood that the translatable item will be correctly translated by the user for that translation aspect.

The phrase "proficiency summary" refers to a compilation of data produced from a user's UMDS data structure, e.g., from proficiency values, memory parameters, and/or memory representations.

The term "flashcard" may refer to both a flashcard data structure (or other user interface data structure) prepared or maintained by a computing device as well as the associated flashcard dashboard (or graphical user interface).

The term "study-text" may refer to both a study-text data structure maintained by a computing device and an associated text dashboard (or text graphical user interface).

The terms "program" or "software" may refer to computer code or set of machine-executable instructions that can be employed to program at least one computing device or processor to implement various aspects of improved language learning with a computer-implemented user-memory data structure. Additionally, it should be appreciated that according to some embodiments, one or more computer programs that, when executed, perform methods of the present technology need not reside on a single computing device or processor, but may be distributed in a modular fashion amongst a number of different computing devices or processors to implement various aspects of the present technology.

The term "associated with," when used in connection with data structures, may be used to describe a combination of data structures. For example, first data associated with second data may mean adding the first data to a data record containing the second data, or vice versa. "Associated with" may mean establishing a relational data structure between first and second data in some embodiments. For example, first data may be entered in a table and/or augmented with an identifier that cross-references or links the first data to second data, even though the first and second data may be stored in different data stores.

The term "transmit," when used in connection with data structures, may be used to describe one or more acts of retrieving data, preparing the data in a format suitable for transmission, identifying at least one destination for the data, and providing the data to a data-transmission device. "Transmit" may include the act of sending the data, by the data preparation or compilation device, to its destination. Acts associated with transmitted data may occur only internal to a device (e.g., transmitting data for display on a display of the device), or may occur external to a device, at least in part (e.g., data prepared by a device is forwarded to an external device, that formats the data for transmission over a network).

XI. Conclusion

Having thus described several aspects of at least one embodiment of an improved language-learning system, it is to be appreciated that various alterations, modifications, and improvements will readily occur to those skilled in the art. Such alterations, modifications, and improvements are intended to be part of this disclosure, and are intended to be within the spirit and scope of the invention. While the present teachings have been described in conjunction with various embodiments and examples, it is not intended that the present teachings be limited to such embodiments or examples. On the contrary, the present teachings encompass various alternatives, and modifications, as will be appreciated by those of skill in the art.

While various inventive embodiments have been described and illustrated, those of ordinary skill in the art will readily envision a variety of other means and/or structures for performing the function and/or obtaining the results and/or one or more of the advantages described, and each of such variations and/or modifications is deemed to be within the scope of the inventive embodiments described. More generally, those skilled in the art will readily appreciate that all parameters and configurations described are meant to be exemplary and that the actual parameters and/or configurations will depend upon the specific application or applications for which the inventive teachings is/are used. Those skilled in the art will recognize, or be able to ascertain using no more than routine experimentation, many alternatives to the specific inventive embodiments described. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure may be directed to each individual feature, system, system upgrade, and/or method described. In addition, any combination of two or more such features, systems, and/or methods, if such features, systems, system upgrade, and/or methods are not mutually inconsistent, is included within the inventive scope of the present disclosure.

Further, though some advantages of the present invention may be indicated, it should be appreciated that not every embodiment of the invention will include every described advantage. Some embodiments may not implement any features described as advantageous. Accordingly, the foregoing description and drawings are by way of example only.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used are for organizational purposes only and are not to be construed as limiting the subject matter described in any way.

In connection with machine-implemented functionality, the above-described embodiments of the invention can be implemented in any of numerous ways. For example, some embodiments may be implemented using hardware, software, firmware, or a combination thereof. When any aspect of an embodiment is implemented at least in part in software, the software code can be executed on any suitable processor or collection of processors, whether provided in a single computer or distributed among multiple computers. The software, when executed, may specifically adapt the processor or collection of processors to perform the functionality according to one or more of the above described embodiments.

In this respect, various aspects of the invention, e.g., an improved language-learning server 120, an application manager 305, a flashcard manager 330, a UMDS manager 340, and a sync manager 360 may be embodied and/or implemented at least in part as machine-readable medium (e.g., a computer memory, one or more floppy discs, compact discs, optical discs, magnetic tapes, flash memories) or other tangible computer storage medium or non-transitory medium) encoded with one or more programs that, when executed on one or more computers or other processor(s), perform acts of the one or more methods as described above. In some embodiments, one or more of these components of an improved language-learning system may be implemented, at least in part, as circuit configurations in Field Programmable Gate Arrays (FPGAs) or other semiconductor devices. As is apparent from the foregoing examples, a computer-readable storage medium may retain information for a sufficient time in a non-transitory form to provide computer-executable instructions. The machine-readable medium may be transportable, such that the program or programs stored thereon can be loaded onto one or more different computers or other processors to implement various aspects of the present technology as discussed above.

Machine-readable instructions may be in any one or combination of several forms, such as program modules, executed by one or more computers or other devices. Generally, program modules may include routines, programs, objects, components, linked libraries, data structures, etc. that perform particular tasks or implement particular data types. Typically the functionality of the program modules may be combined or distributed as desired in various embodiments.

Also, data structures may be stored in machine-readable media in any suitable form. For simplicity of illustration, data structures may be shown to have fields that are related through location in the data structure. Such relationships may likewise be achieved by assigning storage for the fields with locations in a machine-readable medium that conveys relationship between the fields. However, any suitable mechanism may be used to establish a relationship between information in fields of a data structure, including through the use of pointers, tags or other mechanisms that establish relationship between data elements.

Machine-readable instructions may be executable on one or more processors that employ any one of a variety of operating systems or platforms. Additionally, such instructions may be written using any of a number of suitable programming languages and/or programming or scripting tools, and also may be compiled as executable machine language code or intermediate code that is executed on a framework or virtual machine.

Data processors may be implemented as integrated circuits, with one or more processors in an integrated circuit component, including commercially-available integrated circuit components known in the art by names such as CPU chips, GPU chips, microprocessor, microcontroller, or co-processor. Alternatively, a data processor may be implemented in custom circuitry, such as an ASIC, or semicustom circuitry resulting from configuring a programmable logic device. As yet a further alternative, a processor may be a portion of a larger circuit or semiconductor device, whether commercially-available, semicustom, or custom-built. As a specific example, some commercially-available microprocessors have multiple cores such that one or a subset of those cores may constitute a data processor suitable for implementing functionality described above. Though, a processor may be implemented using logic circuitry in any suitable format.

A data-processing device may be embodied in any of a number of forms, such as a rack-mounted computer, a desktop computer, a laptop computer, or a tablet computer. Additionally, a data-processing device may comprise embedded data-processing circuitry in a device not generally regarded as a computer but with suitable processing capabilities, including a Personal Digital Assistant (PDA), a smart phone, a smart watch, or any other suitable portable or fixed computing device.

The terms "program" or "software" may be used to refer to computer code or set of computer-executable instructions that can be employed to program a computer or other processor to implement various aspects of the present technology as discussed above. Additionally, it should be appreciated that according to one aspect of this embodiment, one or more computer programs that, when executed, perform methods of the present technology and need not reside on a single computer or processor, but may be distributed in a modular fashion amongst a number of different computers or processors to implement various aspects of the present technology.

The term "associated with," when used in connection with data structures, may be used to describe a combination of data structures in some embodiments. For example, first data associated with second data may mean adding the first data to a data record containing the second data, or vice versa. "Associated with" may mean establishing a relational data structure between first and second data in some embodiments. For example, first data may be entered in a table or augmented with an identifier that cross-references or links the first data to second data, even though the first and second data may be stored in different data stores.

Where user-interactive displays are described, active text or buttons may alter their appearance when selected or clicked on by a user. For example, active text or buttons may change color or be highlighted in any suitable manner when selected, so as to indicate that the text or button has been selected. The term "active button" may be used to refer to active text.

In some cases, functionality of the system may be described from the perspective of a user acting upon the system. For such descriptions, it will be understood that the system includes the necessary code and hardware that would provide a display for accepting user input, receive and process the input, and execute corresponding functionality responsive to the user input.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used, should be understood to control over dictionary definitions, definitions in documents incorporated by reference, and/or ordinary meanings of the defined terms.

The terms "about," "approximately," and "substantially" may be used to refer to a value, and are intended to encompass the referenced value plus and minus variations that would be insubstantial. The amount of variation could be less than 5% in some embodiments, less than 10% in some embodiments, and yet less than 20% in some embodiments. In embodiments where an apparatus may function properly over a large range of values, e.g., one or more orders of magnitude, the amount of variation could be a factor of two. For example, if an apparatus functions properly for a value ranging from 20 to 350, "approximately 80" may encompass values between 40 and 160.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A device comprising:
    an electronic display;
    a processor in communication with the electronic display;
    a data storage device in communication with the processor, wherein the data storage device includes machine-readable instructions that adapt the device to:
    retrieve text data from a data file;
    render, in a user interface on the electronic display at a plurality of different times, text in a foreign language from the text data, wherein the rendered text includes a translatable item;
    receive translation responses for the translatable item from a user via the user interface at the plurality of different times;
    construct a memory representation for the translatable item based on the translation responses;
    store the memory representation in a user-memory data structure for the user, wherein the memory representation comprises data representative of a time-dependent accuracy of the user's translation response for the translatable item and wherein the user-memory data structure comprises a plurality of memory representations;
    determine, by the processor, an appearance of text to be displayed for the translatable item based on an accuracy determined for the translatable item from the memory representation and from a first time at which the text for the translatable item is to be displayed;
    determine, from the user-memory data structure for the user and from a second time, a level of difficulty for new text;
    display words of the new text in a first color for which a probability of a correct translation by the user is above a first value; and
    display words of the new text in a second color for which a probability of a correct translation by the user is below a second value.

2. The device of claim 1, further comprising machine-readable instructions stored on the data storage device that adapt the processor to determine, from the memory representation, a third time at which the translatable item is to be displayed in a user interface on the electronic display for the user.

3. The device of claim 1, further comprising machine-readable instructions stored on the data storage device that adapt the processor to:
    not display the new text to the user if the level of difficulty exceeds preset value.

4. The device of claim 3, wherein the new text is retrieved automatically from an on-line source.

5. The device of claim 1, further comprising machine-readable instructions stored on the data storage device that adapt the processor to:
    determine, from the user-memory data structure for the user, that a retention value for a translatable item for the user exceeds a predetermined value; and
    remove data from digital memory that was stored in the digital memory in association with the translatable item if the retention value exceeds the predetermined value.

6. The device of claim 1, further comprising machine-readable instructions stored on the data storage device that adapt the processor to determine, from the user-memory data structure for the user and from a third time, which memory representation data is to be exchanged in an update communication with an external device.

7. The device of claim 1, wherein the memory representation includes data that characterizes a rate of decrease as a function of time in an accuracy of the user for providing a correct translation response for the translatable item.

8. The device of claim 1, wherein the memory representation includes a half-life value for the translatable item.

9. The device of claim 1, further comprising an audio speaker and machine-readable instructions that adapt the device to:
    identify first audio data that has been aligned to the translatable item;
    activate the audio speaker to produce a first audio rendering in the foreign language of the translatable item from the first audio data;
    identify second audio data that has been aligned to the translatable item; and activate the audio speaker to produce a second audio rendering in the foreign language of the translatable item from the second audio data, wherein the second audio rendering exhibits a different pronunciation from the first audio rendering.

10. The device of claim 9, wherein the first audio data and second audio data correspond to different dialects.

11. The device of claim 9, wherein the first audio data corresponds to a male speaker and the second audio data corresponds to a female speaker.

12. The device of claim 9, wherein the second audio data corresponds to a same translation as the first audio data but comprises a slower rate of speech than the first audio data.

13. The device of claim 9, further comprising machine-readable instructions that adapt the device to:
receive information identifying a geographic region of a state or country;
identify the first audio data based on the identified geographic region; and
activate the audio speaker to produce the first audio rendering from the first audio data having a dialect that is representative of the identified geographic region.

14. The device of claim 13, wherein the information identifying a geographic region is received from a global positioning system.

15. The device of claim 9, further comprising machine-readable instructions that adapt the device to:
display an audio alignment user interface;
display the rendered text in the audio alignment user interface;
display an audio trace corresponding to an audio file associated with the rendered text;
activate the audio speaker of the device to produce an audio rendering from the audio file;
receive a first alignment input identifying a first location in the rendered text that corresponds to a beginning of the translatable item while the audio rendering is being produced;
store a first identifier that identifies a start location in the audio file for the translatable item;
receive a second alignment input identifying a second location in the rendered text that corresponds to an end of the translatable item while the audio rendering is being produced; and
store a second identifier that identifies a stop location in the audio file for the translatable item.

16. The device of claim 15, further comprising machine-readable instructions that adapt the device to display first and second markers on the audio trace indicating the first and second locations in the audio file.

17. The device of claim 16, further comprising machine-readable instructions that adapt the device to change the first identifier to identify a third location in the audio file that is different from the start location responsive to a user dragging the first marker.

18. A server comprising:
at least one processor;
a data storage device in communication with the processor, wherein the data storage device includes machine-readable instructions that adapt the server to:
retrieve text data from a data file;
prepare user-interface data for rendering, in a user interface on a remote electronic display of an external device at a plurality of different times, text in a foreign language from the text data, wherein the rendered text includes a translatable item;
receive translation responses for the translatable item from a user via the user interface at the plurality of different times;
construct a memory representation for the translatable item based on the translation responses;
store the memory representation in a user-memory data structure for the user, wherein the memory representation comprises data representing a time-dependent accuracy of the user's translation response for the translatable item and wherein the user-memory data structure comprises a plurality of memory representations;
determine, by the processor, an appearance of text to be displayed for the translatable item based on an accuracy determined for the translatable item from the memory representation and from a first time at which the text for the translatable item is to be displayed;
determine, from the user-memory data structure for the user and from a second time, a level of difficulty for new text;
generate user interface data to display words of the new text on the remote electronic display in a first color for which a probability of a correct translation by the user is above a first value; and
generate user interface data to display words of the new text on the remote electronic display in a second color for which a probability of a correct translation by the user is below a second value.

19. The server of claim 18, further comprising machine-readable instructions stored on the data storage device that adapt the server to determine, from the memory representation, a third time at which the translatable item is to be rendered in a user interface on the remote electronic display for the user.

20. The server claim 18, further comprising machine-readable instruction is stored on the data storage device that adapt the server to:
not provide the new text for rendering on the remote electronic display if the level of difficulty exceeds a preset value.

21. The server of claim 18, further comprising machine-readable instructions stored on the data storage device that adapt the server to:
determine, from the user-memory data structure for the user, that a retention value for a translatable item for the user exceeds a predetermined value; and
remove data from digital memory that was stored in the digital memory in association with the translatable item if the retention value exceeds the predetermined value.

22. The server of claim 18, further comprising machine-readable instructions stored on the data storage device that adapt the server to determine, from the user-memory data structure for the user and from a third time, which memory representation data is to be exchanged in an update communication with the external device.

23. The server of claim 18, wherein the memory representation includes data that characterizes a rate of decrease as a function of time in the user's accuracy for providing a correct translation response for the translatable item.

* * * * *

UNITED STATES PATENT AND TRADEMARK OFFICE
CERTIFICATE OF CORRECTION

PATENT NO. : 10,885,809 B2
APPLICATION NO. : 15/575659
DATED : January 5, 2021
INVENTOR(S) : Roche Page 1 of 1

It is certified that error appears in the above-identified patent and that said Letters Patent is hereby corrected as shown below:

In the Specification

In the paragraph immediately following the subheading "RELATED APPLICATIONS", Column 1, Lines 6-13, please replace:
"This application is a national stage of PCT/IB2016/000923 which claims priority under 35 U.S.C. § 119(e) to U.S. Provisional Application Ser. No. 62/255,777, entitled "ENRICHED LANGUAGE-LEARNING SYSTEM" filed on Nov. 16, 2015. PCT/IB2016/000923 also claims the benefit under 35 U.S.C. § 120 of U.S. application Ser. No. 14/719,176, entitled "ENRICHED LANGUAGE-LEARNING SYSTEM" filed on May 21, 2015."

With:
--This application commenced under 35 U.S.C. § 371 to the national stage from international application PCT/IB2016/000923 filed on May 20, 2016. This application is a continuation-in-part of U.S. application No. 14/719,176, filed May 21, 2015, titled "Enriched Language-Learning System," and also claims priority to U.S. provisional application No. 62/255,777, filed November 16, 2015, titled "Enriched Language-Learning System.--

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*